(12) United States Patent
Itoh

(10) Patent No.: US 10,002,584 B2
(45) Date of Patent: Jun. 19, 2018

(54) INFORMATION PROCESSING APPARATUS, INFORMATION PROVIDING METHOD, AND INFORMATION PROVIDING SYSTEM

(71) Applicant: Masahiko Itoh, Kanagawa (JP)

(72) Inventor: Masahiko Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/498,723

(22) Filed: Apr. 27, 2017

(65) Prior Publication Data

US 2017/0229092 A1 Aug. 10, 2017

Related U.S. Application Data

(63) Continuation of application No. 15/200,278, filed on Jul. 1, 2016, now Pat. No. 9,674,647.

(30) Foreign Application Priority Data

Jul. 6, 2015 (JP) ................................ 2015-135321

(51) Int. Cl.
*H04B 1/38* (2015.01)
*G09G 5/00* (2006.01)
*H04L 29/08* (2006.01)
*H04L 12/66* (2006.01)
*G06F 3/147* (2006.01)
(Continued)

(52) U.S. Cl.
CPC ............. *G09G 5/003* (2013.01); *G06F 3/147* (2013.01); *G06F 3/1423* (2013.01); *H04B 11/00* (2013.01); *H04L 12/66* (2013.01); *H04L 67/18* (2013.01); *H04M 1/7253* (2013.01); *H04M 1/72533* (2013.01); *H04N 7/002* (2013.01); *H04W 4/80* (2018.02); *G09G 2370/022* (2013.01); *G09G 2370/042* (2013.01); *G09G 2370/16* (2013.01); (Continued)

(58) Field of Classification Search
CPC ....... H04W 4/02; H04W 4/008; H04W 4/021; H04L 12/66; H04L 67/18
See application file for complete search history.

(56) References Cited

U.S. PATENT DOCUMENTS

| 8,644,792 B2 * | 2/2014 | Lontka ..................... G08B 7/06 340/506 |
| 2013/0208007 A1 * | 8/2013 | Kubo ................ G06F 17/30554 345/633 |
| 2014/0379861 A1 * | 12/2014 | Chaturvedi ......... H04L 67/1097 709/217 |

FOREIGN PATENT DOCUMENTS

JP H06-111172 4/1994

* cited by examiner

*Primary Examiner* — Tuan Pham
(74) *Attorney, Agent, or Firm* — IPUSA, PLLC

(57) ABSTRACT

An information processing apparatus uses a display device to provide display information. The information processing apparatus includes processing circuitry configured to store information relating to a position of an output device that outputs information relating to the output device, and information relating to the display device corresponding to the position of the output device; receive information of a transmission source and the information of the output device acquired by the transmission source, from the transmission source capable of communicating with the information processing apparatus; identify a position of the transmission source, based on the received information; and control the display device corresponding to the position of the transmission source to display the display information, according to the information of the transmission source.

7 Claims, 33 Drawing Sheets

(51) Int. Cl.
  *H04B 11/00*    (2006.01)
  *H04M 1/725*    (2006.01)
  *H04N 7/00*     (2011.01)
  *G06F 3/14*     (2006.01)
(52) U.S. Cl.
  CPC .... *H04M 1/72572* (2013.01); *H04M 2250/06* (2013.01); *H04W 4/90* (2018.02)

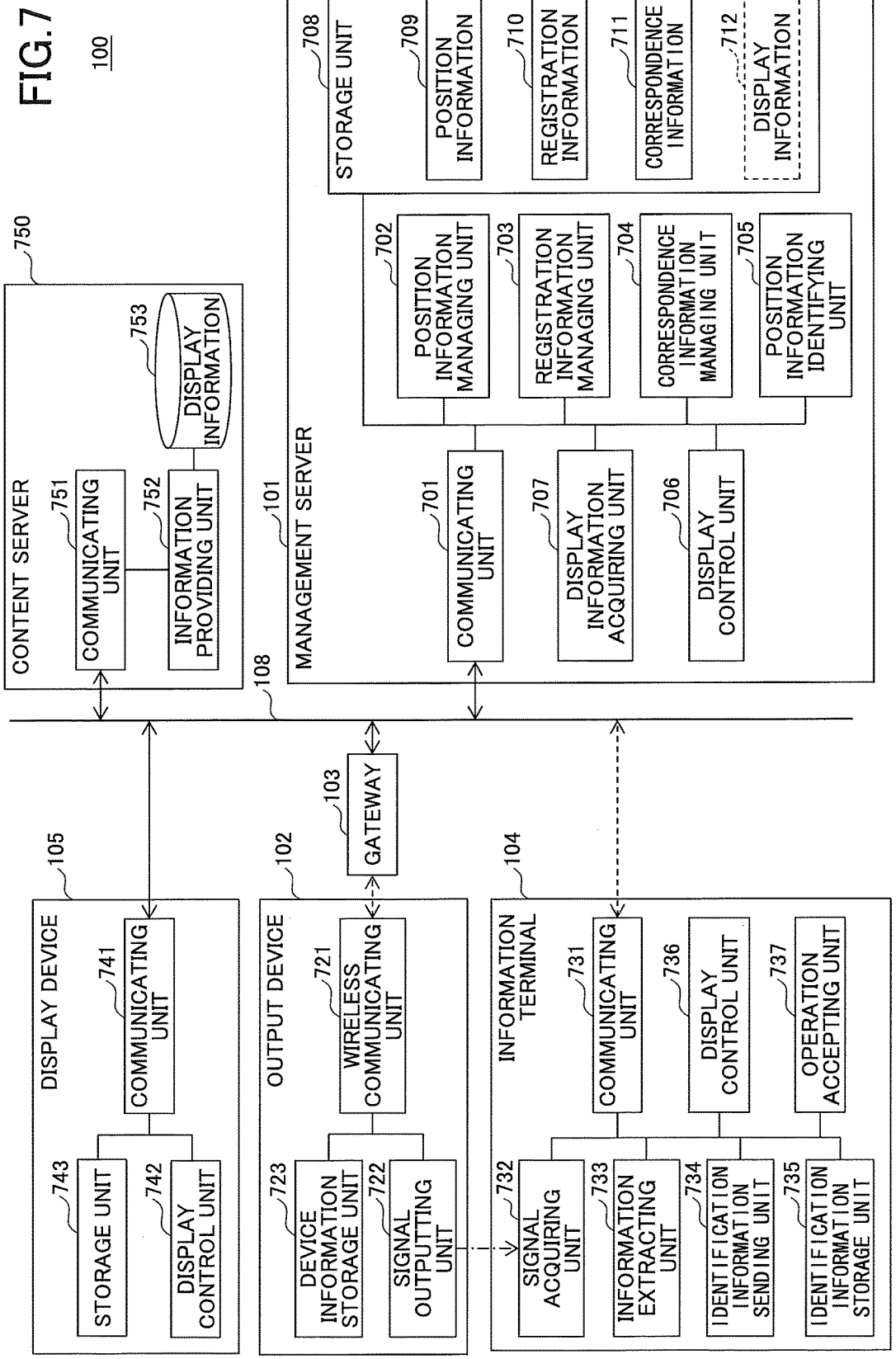

FIG.8A

| OUTPUT DEVICE ID | POSITION |
|---|---|
| SP0001 | SPOT 1 |
| SP0002 | SPOT 2 |
| SP0003 | SPOT 3 |
| SP0004 | SPOT 4 |
| SP0005 | SPOT 5 |
| ... | ... |

| POSITION | DISPLAY DEVICE ID | IP ADDRESS |
|---|---|---|
| SPOT 1 | – | – |
| SPOT 2 | DP0001 | 1.2.3.1 |
| SPOT 3 | DP0002 | 1.2.3.2 |
| SPOT 4 | DP0003 | 1.2.3.3 |
| SPOT 5 | – | – |
| ... | ... | |

802

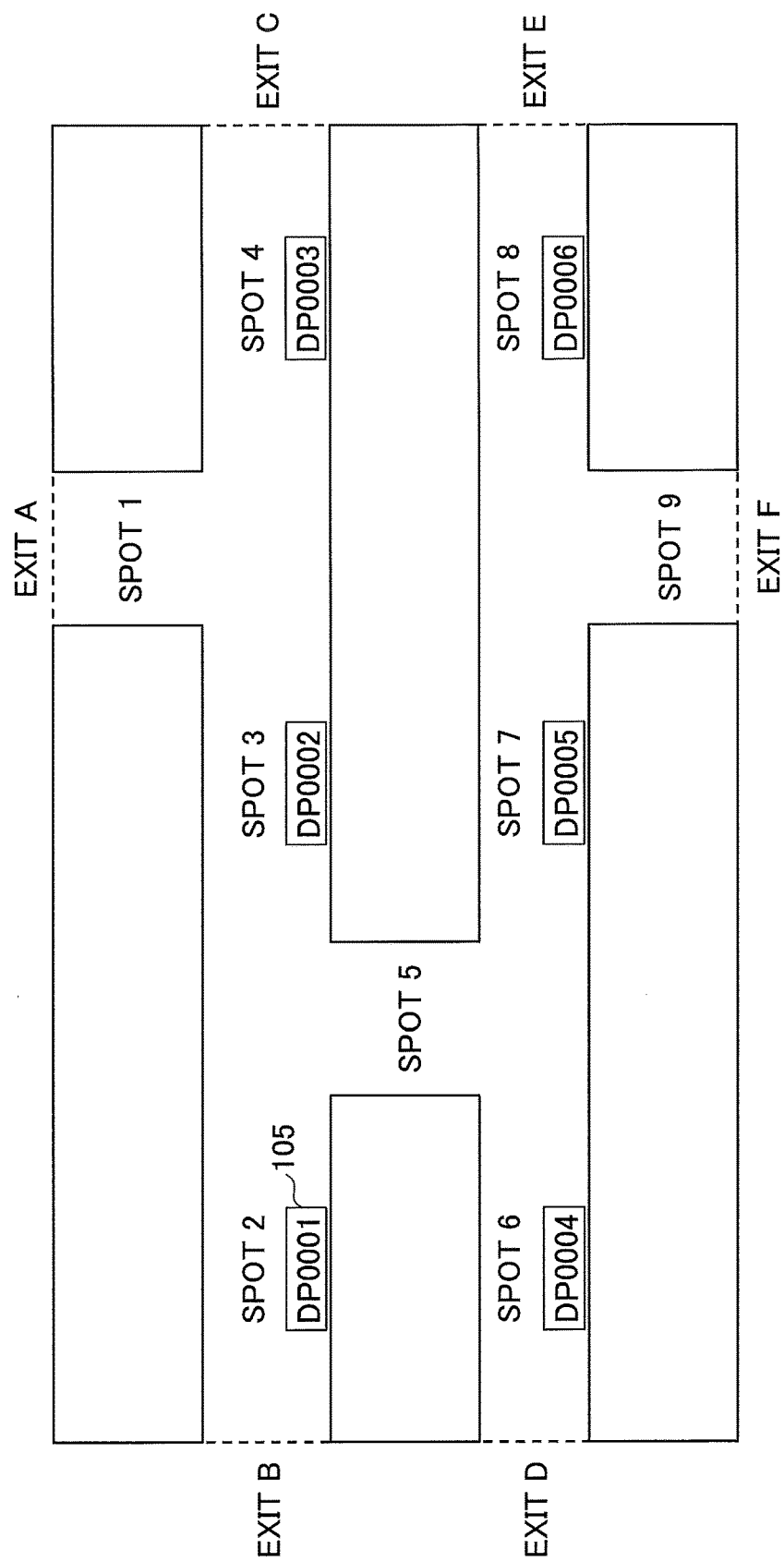

FIG.9

| IDENTIFICATION INFORMATION OF TRANSMISSION SOURCE | OUTPUT DEVICE ID | ACQUISITION TIME AND DATE | POSITION | DISPLAY DEVICE ID | IP ADDRESS |
|---|---|---|---|---|---|
| AP0001 | SP0001 | 20xx/4/3 10:00 | SPOT 1 | — | — |
| AP0002 | SP0002 | 20xx/4/3 9:59 | SPOT 2 | DP0001 | 1.2.3.1 |
| AP0003 | SP0003 | 20xx/4/3 10:05 | SPOT 3 | DP0002 | 1.2.3.2 |
| ... | ... | ... | ... | | |

FIG.10A

| IDENTIFICATION INFORMATION OF TRANSMISSION SOURCE | USER NAME | AREA OF INTEREST | GENDER | INHABITED AREA | ... |
|---|---|---|---|---|---|
| AP0001 | USER A | SHOPPING | FEMALE | TOKYO | ... |
| AP0002 | USER B | BUSINESS | MALE | KANAGAWA | ... |
| AP0003 | USER C | ENTRANCE EXAMINATIONS | FEMALE | CHIBA | ... |
| AP0004 | USER D | TRAVEL | – | – | ... |
| AP0005 | USER E | BUSINESS, SHOPPING | – | – | ... |
| ... | ... | ... | ... | ... | ... |

FIG.10B

| AREA OF INTEREST | POSITION | TIME | CONTENT NAME | CONTENT ID | ACQUISITION DESTINATION |
|---|---|---|---|---|---|
| SHOPPING | SPOT 2 | 10:00 – 20:59 | INFORMATION OF STORE 1 | SID0001 | URL1 |
| | | 21:00 – 9:59 | TRAIN OPERATION INFORMATION | SID0002 | URL2 |
| | SPOT 3 | 9:00 – 10:59 | INFORMATION OF STORE 2 | SID0003 | URL3 |
| | | 11:00 – 12:59 | INFORMATION OF RESTAURANT 1 | SID0004 | URL4 |
| | | 13:00 – 19:59 | INFORMATION OF STORE 2 | SID0003 | URL3 |
| | | 20:00 – 8:59 | TRAIN OPERATION INFORMATION | SID0002 | URL2 |
| | SPOT 4 | WHOLE DAY | WEATHER INFORMATION | SID0005 | URL5 |
| | ... | ... | ... | ... | ... |
| BUSINESS | SPOT 2, 3, 4, 6, 7, 8 | 5:30 – 0:29 | TRAIN OPERATION INFORMATION | BID0001 | URL10 |
| | | 0:30 – 5:29 | ACCOMMODATION INFORMATION | BID0002 | URL11 |
| | ... | ... | ... | ... | ... |
| ... | ... | ... | ... | ... | ... |

| IDENTIFICATION INFORMATION OF TRANSMISSION SOURCE | APPLICATION TYPE |
|---|---|
| AP0001 | MAP |
| AP0002 | NEWS |
| AP0003 | WEATHER |
| AP0004 | TRANSPORTATION |
| AP0005 | SHOPPING |
| AP0006 | SPORTS |
| AP0007 | – |
| ... | ... |

FIG.11B

| APPLICATION TYPE | POSITION | TIME | CONTENT NAME | CONTENT ID | ACQUISITION DESTINATION |
|---|---|---|---|---|---|
| MAP | SPOT 2 | 5:00 – 22:59 | ROUTE TO STATION | MID0001 | URL21 |
| | | 23:00 – 23:59 | LAST TRAIN INFORMATION | MID0002 | URL22 |
| | | 0:00 – 4:59 | ACCOMMODATION INFORMATION | MID0003 | URL23 |
| | SPOT 3 | WHOLE DAY | FLOOR GUIDE | MID0004 | URL24 |
| | SPOT 4 | 6:00 – 22:59 | BUS STATION INFORMATION | MID0005 | URL25 |
| | | 23:00 – 5:59 | TAXI STAND INFORMATION | MID0006 | URL26 |
| | ... | ... | ... | ... | ... |
| NEWS | SPOT 2 | 5:00 – 23:59 | PUBLIC TRANSPORTATION OPERATION INFORMATION | NID0001 | URL31 |
| | | 0:00 – 4:59 | AREA INFORMATION | NID0002 | URL32 |
| | SPOT 3 | WHOLE DAY | THIS WEEK'S EVENTS INFORMATION | NID0003 | URL33 |
| | SPOT 4 | WHOLE DAY | RAINFALL PROBABILITY INFORMATION | NID0004 | URL34 |
| | ... | ... | ... | ... | ... |
| WEATHER | SPOT 2, 3, 4, 6, 7, 8 | WHOLE DAY | WEATHER, TEMPERATURE OF OUTDOORS | WID0001 | URL41 |
| ... | ... | ... | ... | ... | ... |

711

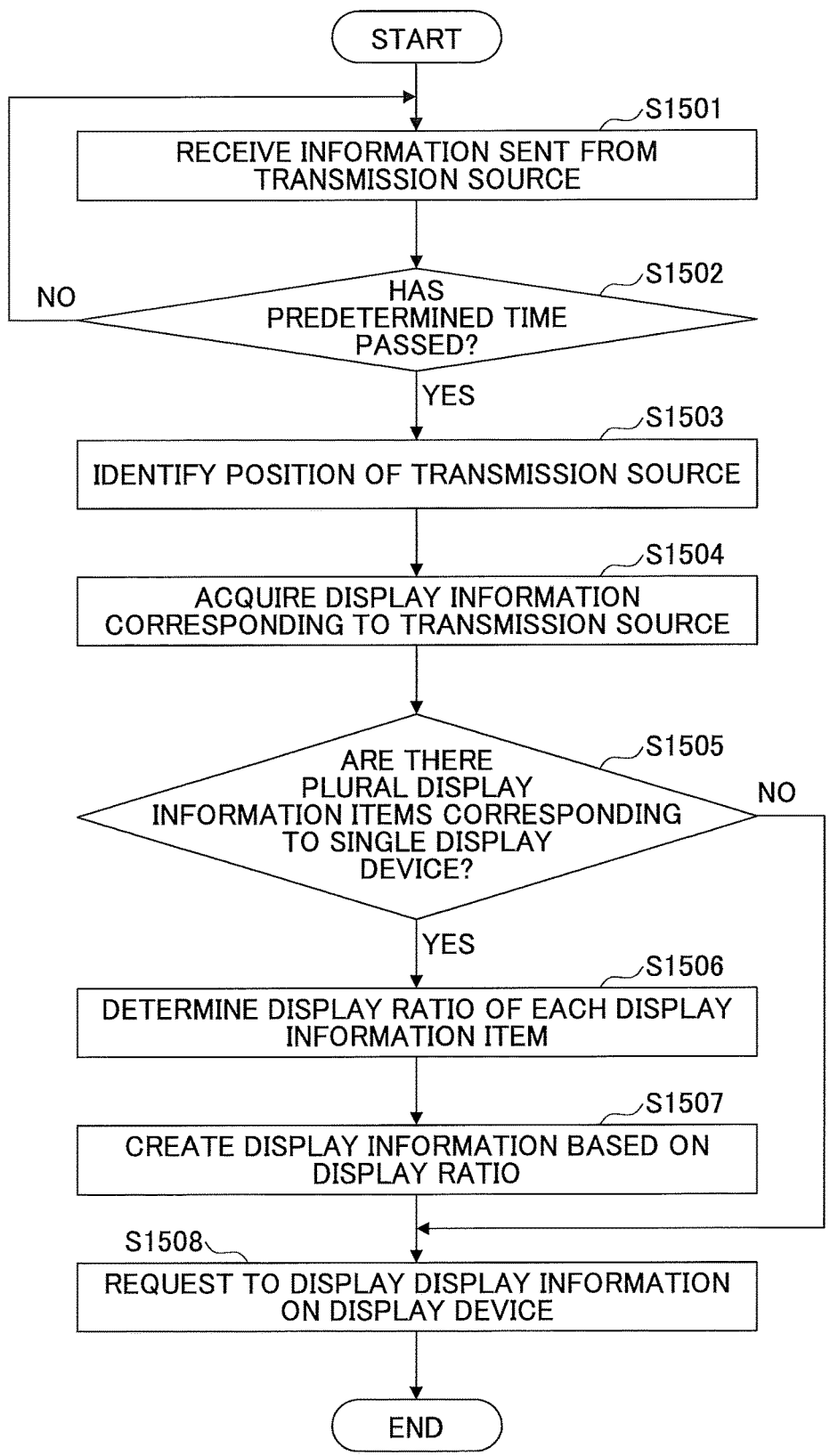

FIG.16A

| POSITION | CONTENT ID | CONTENT NAME | NUMBER OF TRANSMISSION SOURCES | PRIORITY RANKING | DISPLAY RATIO |
|---|---|---|---|---|---|
| SPOT 2 | NID0001 | PUBLIC TRANSPORTATION OPERATION INFORMATION | 3 | 1 | 3/6 |
| | MID0001 | ROUTE INFORMATION TO STATION | 2 | 2 | 2/6 |
| | WID0001 | WEATHER, TEMPERATURE OF OUTDOORS | 1 | 3 | 1/6 |
| ... | ... | ... | ... | ... | ... |

FIG.19

| POSITION | CONTENT ID | CONTENT NAME | NUMBER OF TRANSMISSION SOURCES | PRIORITY RANKING | DISPLAY TIME |
|---|---|---|---|---|---|
| SPOT 2 | NID0001 | PUBLIC TRANSPORTATION OPERATION INFORMATION | 3 | 1 | 6 SECONDS |
| | MID0001 | ROUTE INFORMATION TO STATION | 2 | 2 | 4 SECONDS |
| | WID0001 | WEATHER, TEMPERATURE OF OUTDOORS | 1 | 3 | 2 SECONDS |
| | ... | ... | ... | ... | ... |
| ... | | | | | |

FIG.22A

| DISPLAY DEVICE ID | IP ADDRESS | POSITION |
|---|---|---|
| DP0001 | 1.2.3.1 | SPOT A |
| DP0002 | 1.2.3.2 | SPOT B |
| DP0003 | 1.2.3.3 | SPOT C |
| DP0004 | 1.2.3.4 | SPOT D |
| DP0005 | 1.2.3.5 | SPOT E |
| DP0006 | 1.2.3.6 | SPOT F |

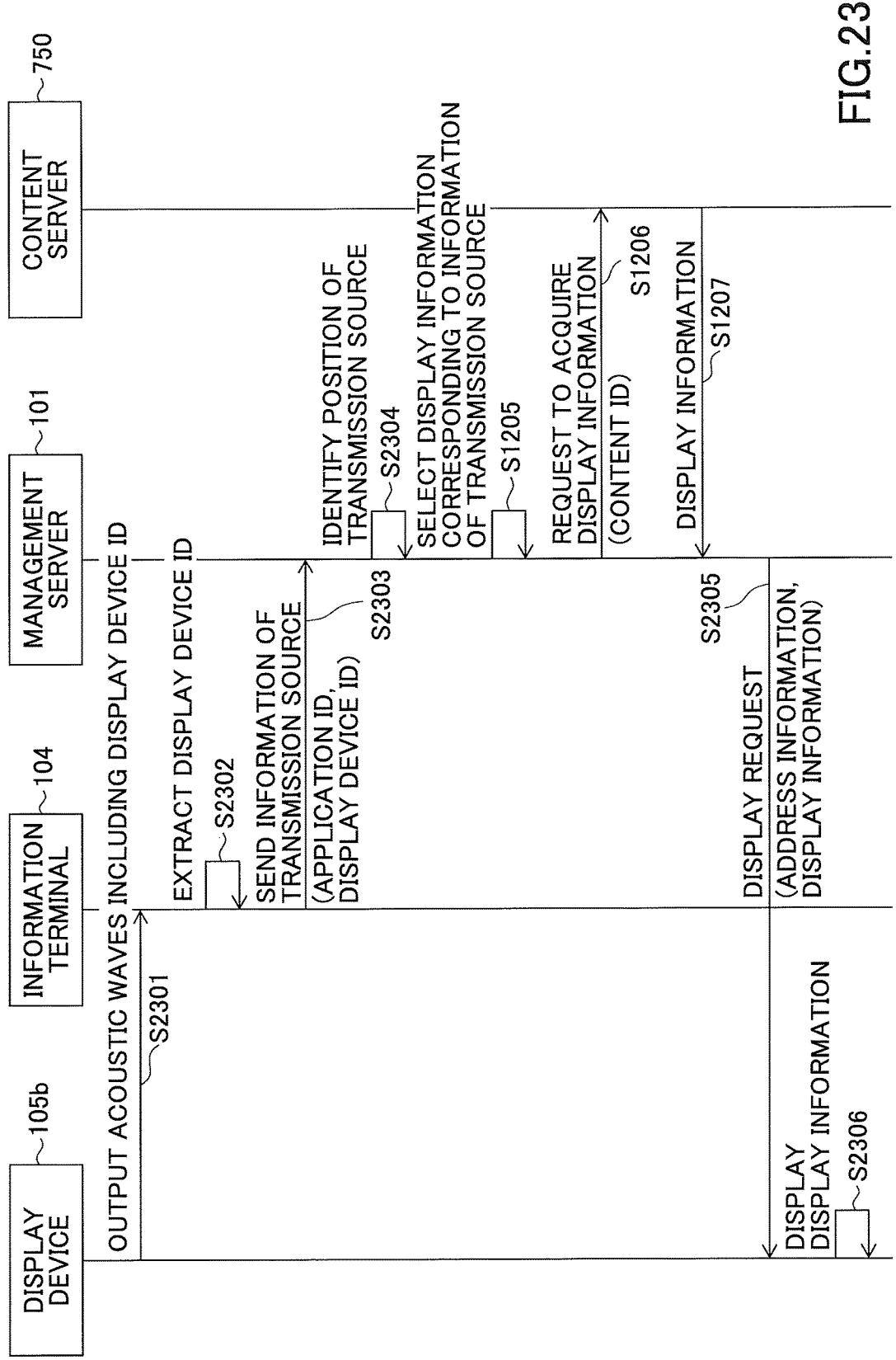

FIG.26A

| OUTPUT DEVICE ID | POSITION | TEMPERATURE | BRIGHTNESS LEVEL (0-5) | CROWD LEVEL (0-5) | ... |
|---|---|---|---|---|---|
| SP0001 | SPOT 1 | 20 DEGREES | 3 | 2 | ... |
| SP0002 | SPOT 2 | 23 DEGREES | 2 | 5 | ... |
| SP0003 | SPOT 3 | 22 DEGREES | 4 | 4 | ... |
| ... | ... | ... | ... | ... | ... |

FIG.26B

| APPLICATION TYPE | POSITION | TEMPERATURE | CONTENT NAME | CONTENT ID | ACQUISITION DESTINATION |
|---|---|---|---|---|---|
| MAP | SPOT 2 | LESS THAN 10 DEGREES | FIREPLACE AND WINE | TID0001 | URL51 |
| | | 10 DEGREES TO 25 DEGREES | RECOMMENDED DISH OF RESTAURANT 1 | TID0002 | URL52 |
| | | HIGHER THAN 25 DEGREES | SEASIDE AND BEER | TID0003 | URL53 |
| ... | ... | | ... | ... | ... |

FIG.26C

| APPLICATION TYPE | POSITION | TIME | CONTENT NAME | CONTENT ID | ACQUISITION DESTINATION |
|---|---|---|---|---|---|
| MAP | SPOT 2 | 9:00 – 20:59 | CROWD LEVEL IN PREMISE | JID0001 | DISPLAY INFORMATION 1 |
| | | 21:00 – 8:59 | TEMPERATURE AT SPOT 2 | JID0002 | DISPLAY INFORMATION 2 |
| ... | ... | ... | ... | ... | ... |

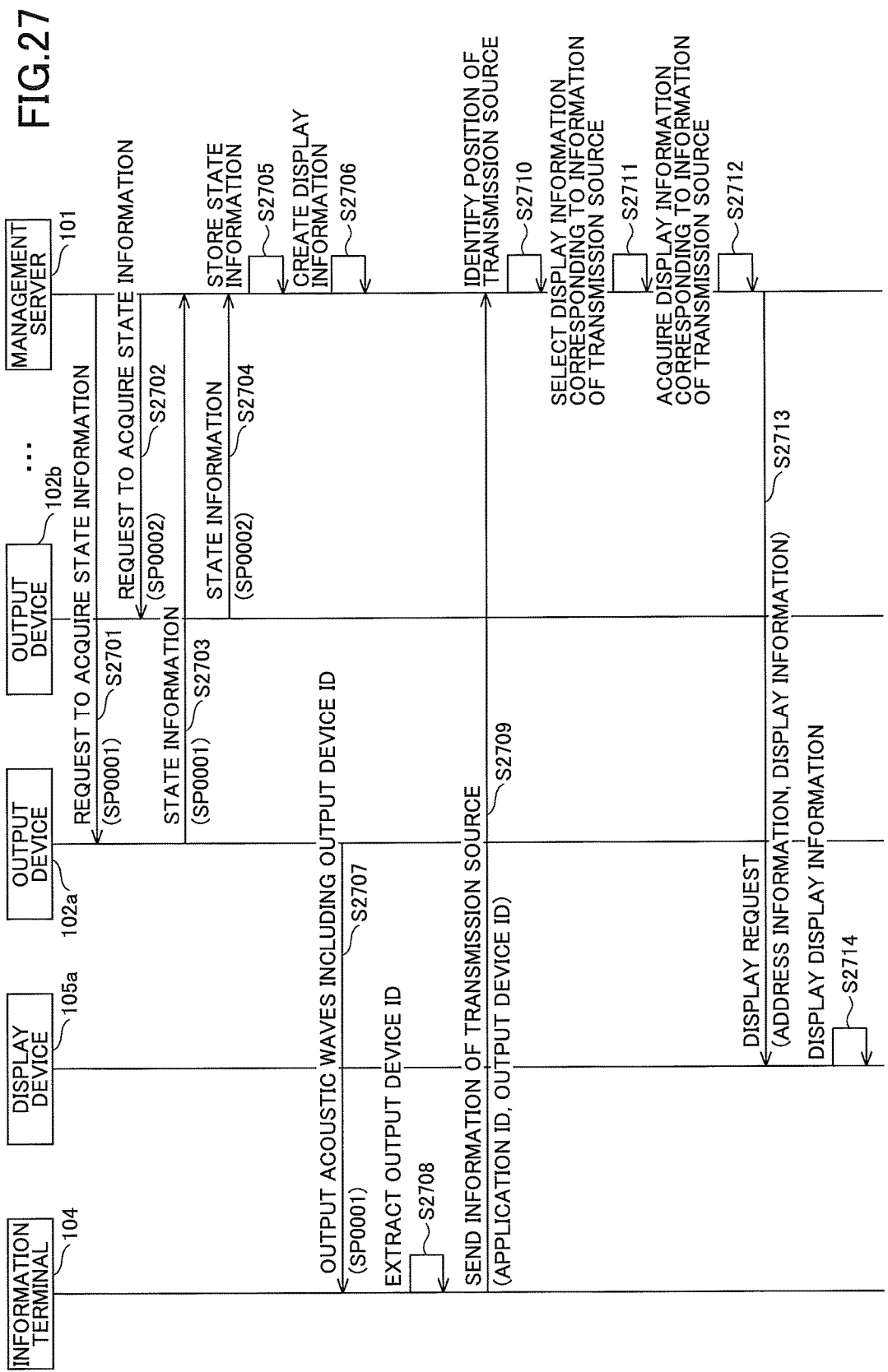

INFORMATION PROCESSING APPARATUS, INFORMATION PROVIDING METHOD, AND INFORMATION PROVIDING SYSTEM

CROSS-REFERENCE TO RELATED APPLICATION

The present application is a continuation of U.S. application Ser. No. 15/200,278, filed on Jul. 1, 2016, which is based on Japanese Patent Application No. 2015-135321, filed on Jul. 6, 2015, the contents of which are incorporated herein by reference in their entirety.

BACKGROUND OF THE INVENTION

1. Field of the Invention

The present disclosure relates to information processing apparatuses, information providing methods, and information providing systems.

2. Description of the Related Art

There is known a typical digital signage panel for providing display information such as an advertisement, etc., to a plurality of users, at various locations such as outdoors, at the storefront, in a public space, and in public transportation, etc., by using a display device such as a projector and a display, etc.

Furthermore, there is known an evacuation guidance system, which deduces the direction in which the disaster is expanding and the evacuation route, based on output from a disaster-prevention reception panel and a person position detector. The disaster-prevention reception panel is for recognizing the type and location of the disaster that has occurred. The person position detector is for detecting a position of a plurality of persons. The evacuation guidance system displays a guidance route on a display device based on the deduced information.

SUMMARY OF THE INVENTION

The present disclosure provides an information processing apparatus, an information providing method, and an information providing system, in which one or more of the above-described disadvantages are eliminated.

According to one aspect of the present disclosure, there is provided an information processing apparatus for using a display device to provide display information, the information processing apparatus including processing circuitry configured to store information relating to a position of an output device that outputs information relating to the output device, and information relating to the display device corresponding to the position of the output device; receive information of a transmission source and the information of the output device acquired by the transmission source, from the transmission source capable of communicating with the information processing apparatus; identify a position of the transmission source, based on the received information; and control the display device corresponding to the position of the transmission source to display the display information, according to the information of the transmission source.

BRIEF DESCRIPTION OF THE DRAWINGS

Other objects, features and advantages of the present disclosure will become more apparent from the following detailed description when read in conjunction with the accompanying drawings, in which:

FIG. 7 is a block diagram of a functional configuration of the information providing system according to an embodiment of the present disclosure;

FIGS. 8A through 8C are diagrams illustrating examples of information stored by a position information managing unit according to an embodiment of the present disclosure;

FIG. 9 is a diagram illustrating an example of information identified by a position information identifying unit according to an embodiment of the present disclosure;

FIGS. 10A and 10B are diagrams illustrating examples of registration information and correspondence information according to an embodiment of the present disclosure;

FIGS. 11A and 11B are diagrams illustrating other examples of the registration information and the correspondence information according to an embodiment of the present disclosure;

FIG. 15 is a flowchart illustrating a process flow of the management server according to the second embodiment of the present disclosure;

FIGS. 16A and 16B are diagrams illustrating examples of a display ratio of display information and display information according to the second embodiment of the present disclosure;

FIG. 19 is a diagram illustrating an example of a priority ranking of display information according to the third embodiment of the present disclosure;

FIGS. 22A and 22B are diagrams illustrating examples of information stored by the position information managing unit according to the fourth embodiment of the present disclosure;

FIG. 23 is a sequence diagram of an example of a process performed by the information providing system according to the fourth embodiment of the present disclosure;

FIGS. 26A through 26C are diagrams illustrating examples of state information and correspondence information according to the fifth embodiment of the present disclosure; and FIG. 27 is a sequence diagram of an example of a process performed by the information providing system according to the fifth embodiment of the present disclosure.

DETAILED DESCRIPTION OF THE PREFERRED EMBODIMENTS

A problem to be solved by an embodiment of the present disclosure is to provide an information providing system that uses a display device to provide display information to a plurality of users, and that facilitates the operation of providing the display information according to the respective users.

Embodiments of the present disclosure will be described with reference to the accompanying drawings.

<System Configuration>

First, a description is given of an example of a configuration of an information providing system according to the present embodiment.

Figure 1:
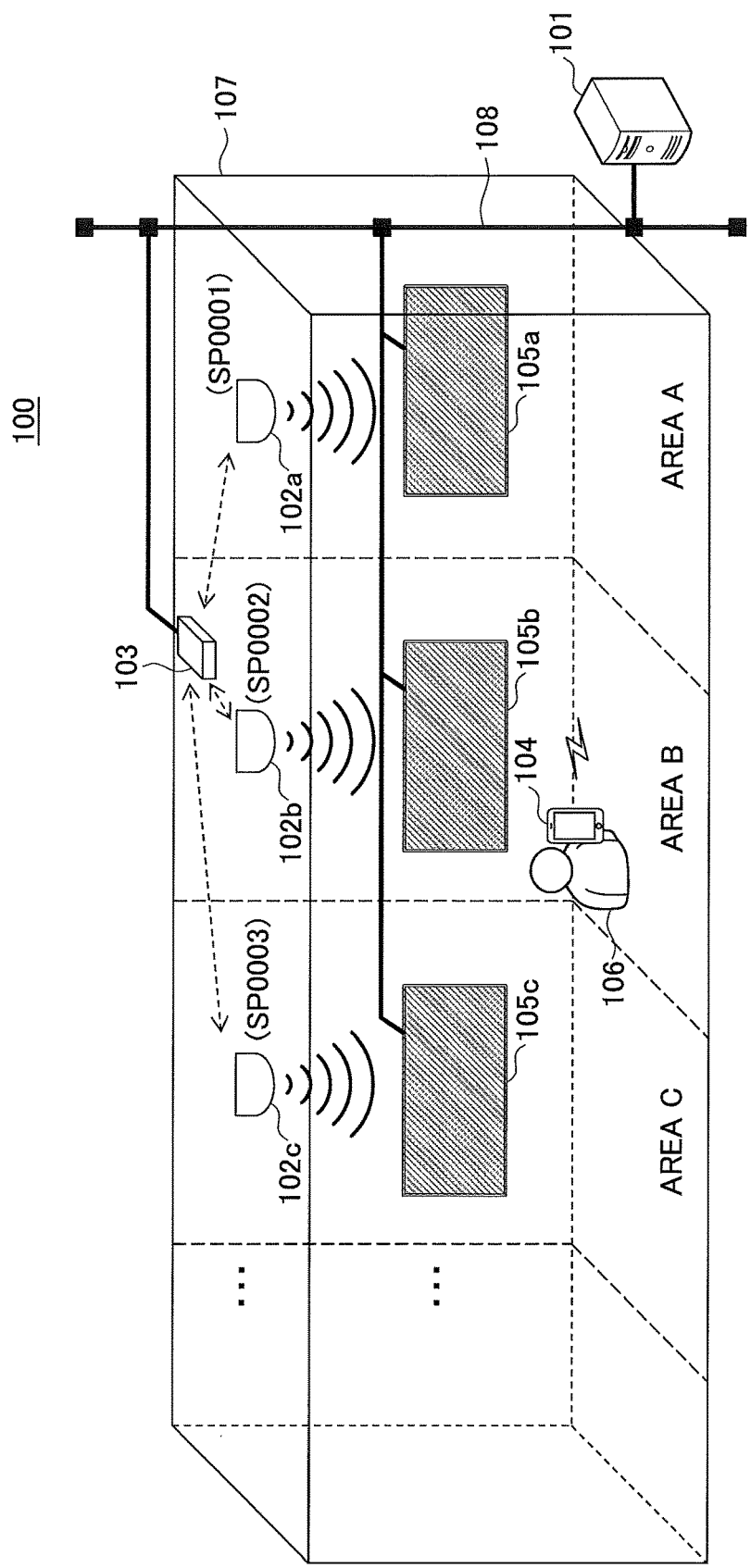
FIG. 1 is a diagram illustrating an example of a configuration of an information providing system according to an embodiment of the present disclosure.

FIG. 1 is a diagram illustrating an example of a configuration of an information providing system according to an embodiment of the present disclosure. An information providing system 100 includes a management server 101, a plurality of output devices 102a, 102b, and 102c, a gateway 103, an information terminal 104, and a plurality of display devices 105a, 105b, and 105c, etc. Note that in the following description, "output device 102" is used for referring to any one of the plurality of output devices 102a, 102b, and 102c. Furthermore, "display device 105" is used for referring to any one of the plurality of display devices 105a, 105b, and 105c. Note that the numbers of the output devices 102, the gateway 103, the information terminal 104, and the display devices 105, etc., are merely examples.

The plurality of output devices 102a, 102b, and 102c are installed at different positions from each other, for example, on the ceiling, etc., of a building 107. The plurality of output devices 102a, 102b, and 102c respectively output signals including information of the own device, i.e., the output device 102 itself (for example, identification information and position information, etc., of the own device), to an area corresponding to the own device. In the example of FIG. 1, the output device 102a outputs acoustic waves including an output device ID "SP0001", which is identification information of the own device, to an area A. Furthermore, the output device 102b outputs acoustic waves including an output device ID "SP0002" of the own device to an area B. Similarly, the output device 102c outputs acoustic waves including an output device ID "SP0003" of the own device to an area C.

Furthermore, the output device 102 can connect to a wireless network provided by the gateway 103 and communicate with the management server 101 via the gateway 103. The output device 102 may output an output device ID specified by the management server 101, or may output an output device ID that is stored by the output device 102 in advance.

The gateway 103 is connected to the management server 101 via a network 108 such as the Internet and LAN (Local Area Network), etc., and forms a wireless network together with the output devices 102. The gateway 103 transfers data between the output devices 102 connected to a wireless network provided by the gateway 103 and the management server 101.

The information terminal 104 is an information terminal such as a smartphone, a mobile phone, and a tablet terminal, etc., held by the user, and can connect to the network 108 and communicate with the management server 101 by wireless communication. Furthermore, the information terminal 104 executes an application program (hereinafter referred to as "application") for the information terminal 104 corresponding to the information providing system 100.

The information terminal 104 executes an application for the information terminal 104 to acquire acoustic waves output by the output device 102 with the use of a built-in microphone, etc., and extract information of the own device of the output device 102 (for example, an output device ID) included in the acquired acoustic waves. Furthermore, the application of the information terminal 104 includes identification information (hereinafter referred to as "application ID") unique to each application installed in the information terminal 104. When the information terminal 104 executes the application and extracts the information of the own device of the output device 102, the information terminal 104 sends the extracted information of the own device of the output device 102 and transmission source information including the application ID of the information terminal 104 itself, to the management server 101.

Note that the application ID is an example of identification information for identifying the user, the information terminal 104, or the application operating in the information terminal 104. By using an application ID, the information providing system 100 is able to identify the information terminal 104 and the application, without depending on personal information such as a phone number and a mail address, etc. However, the above configuration is merely an example; for example, the information terminal 104 may use identification information of the information terminal or identification information of the user, etc., instead of the application ID.

The management server 101 is an information processing apparatus such as a Personal Computer (PC), etc., connected to the network 108, and executes an application for the management server 101 corresponding to the information providing system 100. Note that the management server 101 may be formed by a plurality of information processing apparatuses. The management server 101 stores position information of the output device 102 including information of the location where each output device 102 is installed, etc., and can identify the position of the information terminal 104 based on the transmission source information acquired from the information terminal 104.

Furthermore, the management server 101 stores position information of the display device 105 including information of the location where the display device 105 is installed and registration information corresponding to the application ID, and causes the display device 105 corresponding to the position where the information terminal 104 is detected, to display the display information corresponding to the application ID.

The display device 105 is, for example, a projector or a display, etc., and displays display information instructed by the management server 101. For example, the display device 105 is connected to the network 108 via a wireless/wired LAN, etc., and displays display information in response to a request to display the display information received from the management server 101.

Note that the arrangement of the display device 105 and the number of display devices 105, etc., in FIG. 1 are merely examples. For example, in the example of FIG. 1, the display devices 105 are arranged along a single wall; however, the display devices 105 may be installed in any direction. Furthermore, a plurality of the display devices 105 may be installed in a single area, or there may be an area where no display devices 105 are installed.

In the above configuration, for example, when the management server 101 detects the information terminal 104 in an area B corresponding to the output device 102b, the management server 101 causes the display device 105b installed in the area B to display the display information corresponding to the application ID of the information terminal 104. Furthermore, for example, in FIG. 1, when a user 106 moves through the areas in the order of the area C, the area B, and the area A, the information corresponding to the application ID of the information terminal 104 is sequentially displayed on display devices in the order of the display device 105c, the display device 105b, and the display device 105a, in line with the positions of the information terminal 104.

As described above, according to the present embodiment, in the information providing system 100 providing information to a plurality of users by using the display devices 105, an information processing apparatus (management server 101), which facilitates the operation of providing display information according to the respective users 106, can be provided.

<Hardware Configuration>

Next, a description is given of hardware configurations of the devices included in the information providing system 100.

(Hardware Configuration of Management Server)

Figure 2:
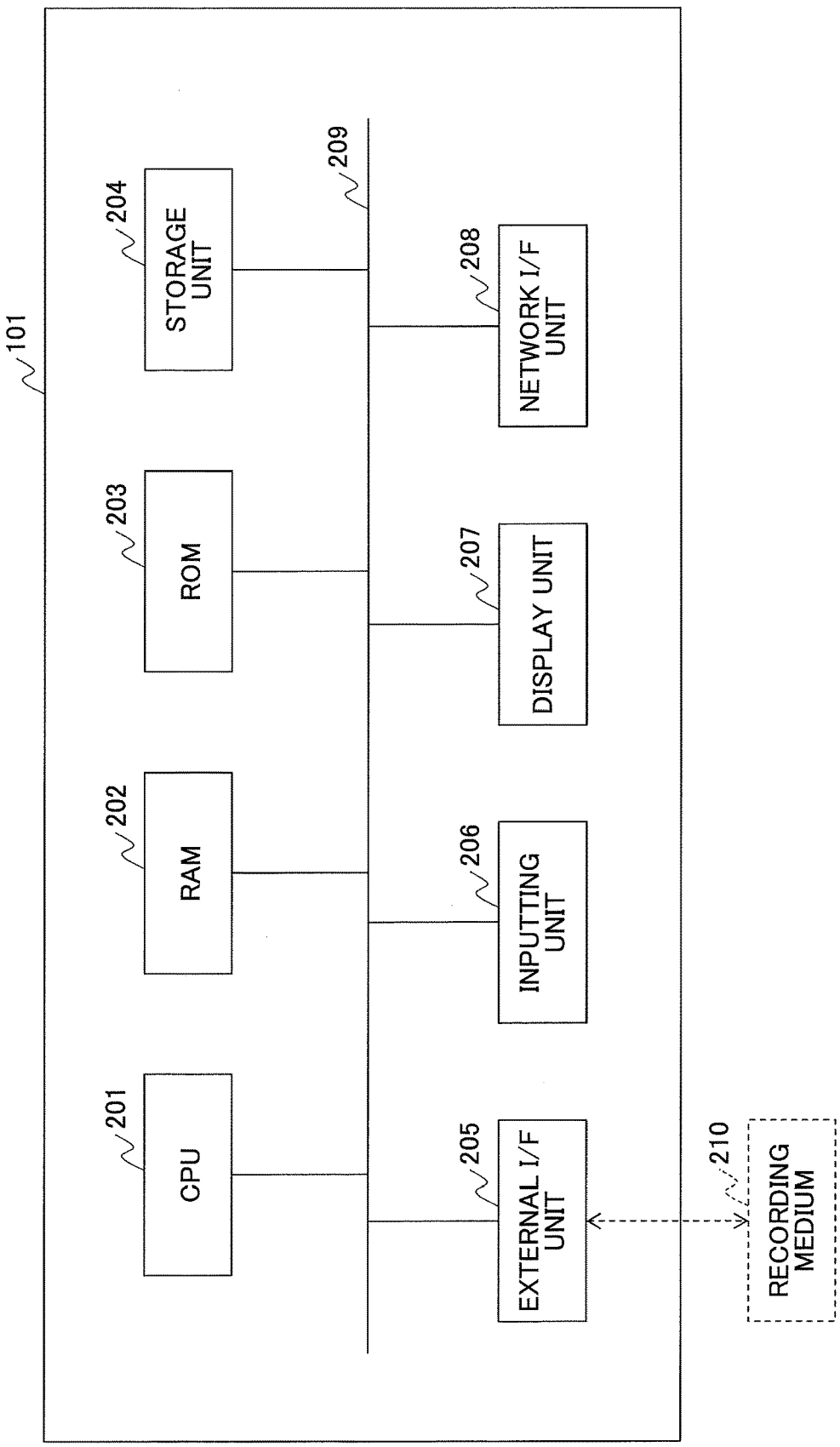
FIG. 2 is a block diagram illustrating an example of a hardware configuration of a management server according to an embodiment of the present disclosure.

FIG. 2 is a block diagram illustrating an example of a hardware configuration of the management server 101 according to an embodiment of the present disclosure. The management server 101 has a configuration of a general-purpose computer. The management server 101 includes, for example, a Central Processing Unit (CPU) 201, a Random Access Memory (RAM) 202, a Read-Only Memory (ROM) 203, a storage unit 204, an external interface (I/F) unit 205, an inputting unit 206, a display unit 207, a network I/F unit 208, and a bus 209, etc.

The CPU 201 (example of processing circuitry) is an arithmetic device for implementing various functions of the management server 101, by loading the programs and data stored in the ROM 203 and the storage unit 204, etc., into the RAM 202, and executing processes. The RAM 202 is a volatile memory used as a work area, etc., of the CPU 201. The ROM 203 is a non-volatile memory for holding programs and data even after the power is turned off.

The storage unit 204 is a storage device such as a Hard Disk Drive (HDD) and a Solid State Drive (SSD), etc., and stores an Operating System (OS), an application program, and various kinds of data, etc.

The external I/F unit 205 is an interface between the management server 101 and an external device. The external device includes, for example, a recording medium 210. The management server 101 is able to read and/or write data from/in the recording medium 210, via the external I/F unit 205. For example, the recording medium 210 includes an optical disk, a magnetic disk, a memory card, and a Universal Serial Bus (USB) memory, etc. Furthermore, a predetermined program may be stored in the recording medium 210, and by installing the program stored in the recording medium 210 in the management server 101 via the external I/F unit 205, the management server 101 is able to execute a predetermined program.

The inputting unit 206 is an input device including a pointing device such as a mouse and a keyboard, etc., and is used for inputting various operation signals in the management server 101. The display unit 207 is a display device such as a display, etc., for displaying processing results, etc., obtained by the management server 101.

The network I/F unit 208 is a communication interface such as a wired/wireless LAN, etc., for connecting the management server 101 to the network 108. The management server 101 is able to perform data communication with another device via the network I/F unit 208 and the network 108. The bus 209 is connected to the above elements, and transmits address signals, data signals, and various control signals, etc.

(Hardware Configuration of Output Device)

Figure 3:
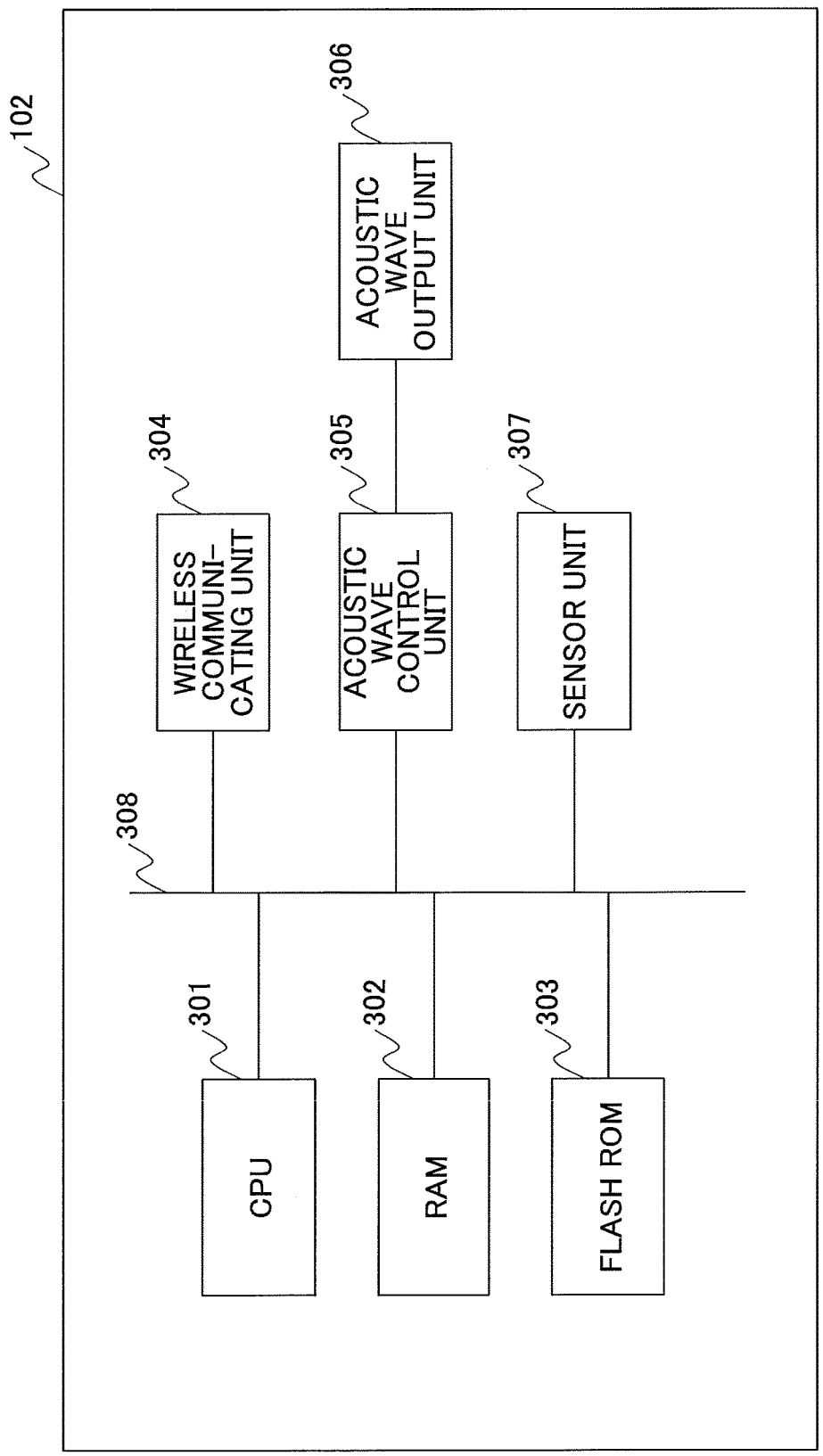
FIG. 3 is a block diagram illustrating an example of a hardware configuration of an output device according to an embodiment of the present disclosure.

FIG. 3 is a block diagram illustrating an example of a hardware configuration of the output device 102 according to an embodiment of the present disclosure. The output device 102 includes, for example, a CPU 301, a RAM 302, a flash ROM 303, a wireless communicating unit 304, an acoustic wave control unit 305, an acoustic wave outputting unit 306, a sensor unit 307, and a bus 308, etc.

The CPU 301 (example of processing circuitry) is an arithmetic device for implementing various functions of the output device 102, by executing programs stored in the flash ROM 303, etc. The RAM 302 is a volatile memory used as a work area, etc., of the CPU 301. The flash ROM 303 is a non-volatile memory for storing programs for the output device 102, and unique information such as an output device ID, etc.

The wireless communicating unit 304 includes a transmission/reception circuit and an antenna, etc., for performing wireless communication with the gateway 103. In the present embodiment, it is assumed that the wireless communicating unit 304 performs communication with the gateway 103 by using, for example, wireless LAN, Zigbee (registered trademark), or a specific power saving wireless communication method (IEEE802.15.4g) of a 920 MHz band, etc.

The acoustic wave control unit 305 converts the information such as an output device ID, etc., stored in the flash ROM 303, etc., into acoustic wave signals, and outputs the acoustic wave signals to the acoustic wave outputting unit 306.

Preferably, the acoustic wave control unit 305 implements control to output information such as an output device ID, etc., by using a high frequency of for example, higher than or equal to 16 kHz, among the voice sound frequency bands. The directivity of acoustic waves becomes higher as the frequency increases. A frequency of higher than or equal to 16 kHz can hardly be heard by a human being. Therefore, a frequency of higher than or equal to 16 kHz is appropriate for sending information such as an output device ID.

Note that in the present embodiment, the specific method of transferring data by acoustic waves is not particularly limited; however, for example, the information may be transmitted by performing a known modulation method such as Frequency Shift Keying (FSK) and Phase Shift Keying (PSK), etc., on acoustic waves of a predetermined frequency.

Alternatively, the method of transferring data by acoustic waves may be for expressing digital values "1"/"0", by turning on/off the signals of a predetermined frequency (for example, 19 kHz). In this case, the information terminal 104 that receives the acoustic waves may acquire information included in the acoustic waves, for example, by determining whether there is a frequency that is defined in advance by a predetermined sampling rate.

The acoustic wave outputting unit 306 includes, for example, an electroacoustic transducer such as a speaker, etc., which converts the acoustic wave signals input from the acoustic wave control unit 305 into acoustic waves and outputs the acoustic waves.

The sensor unit 307 includes a detection device such as a temperature sensor, an illuminance sensor, a human detection sensor, a camera sensor, and a sound sensor (microphone), etc. It is assumed that the sensor unit 307 includes a detection device selected according to demand of the system, among these detection devices.

The bus 308 is connected to the above elements, and transmits address signals, data signals, and various control signals, etc.

(Hardware Configuration of Gateway)

Figure 4:
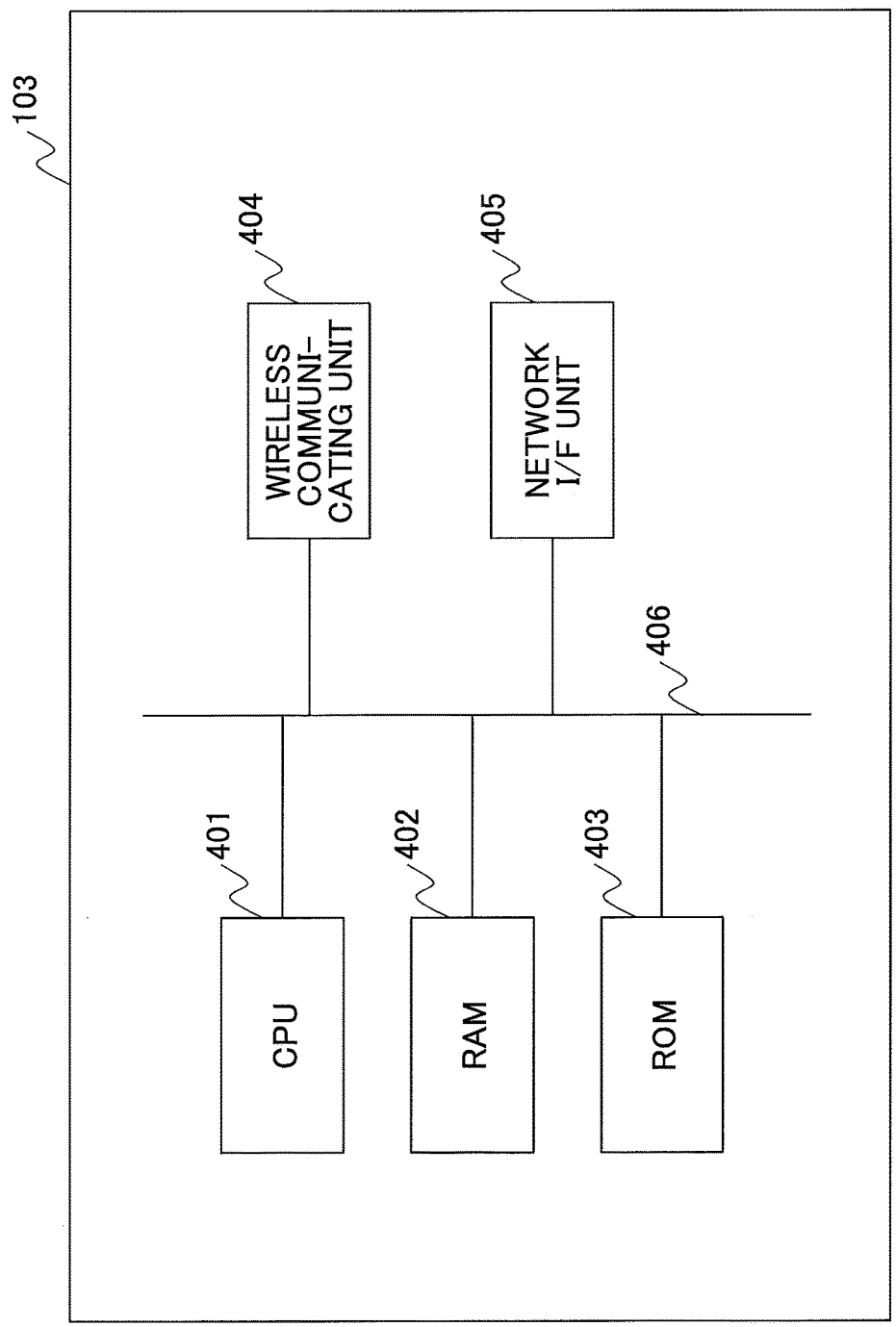
FIG. 4 is a block diagram illustrating an example of a hardware configuration of a gateway according to an embodiment of the present disclosure.

FIG. 4 is a block diagram illustrating an example of a hardware configuration of the gateway 103 according to an embodiment of the present disclosure. The gateway 103 includes, for example, a CPU 401, a RAM 402, a ROM 403, a wireless communicating unit 404, a network I/F unit 405, and a bus 406.

The CPU 401 (example of processing circuitry) is an arithmetic device for implementing various functions of the gateway 103, by executing programs stored in the ROM 403, etc. The RAM 402 is a volatile memory used as a work area, etc., of the CPU 401. The ROM 403 is a non-volatile memory for storing programs for the gateway 103. The ROM 403 may be a rewritable volatile memory, such as a flash ROM and an EEPROM, etc.

The wireless communicating unit 404 includes a wireless circuit and an antenna, etc., for performing wireless communication by the same wireless communication method as the wireless communication method of the wireless communicating unit 304 of the output device 102 described above.

The network I/F unit 405 is a communication interface such as a wired/wireless LAN, etc., for connecting the gateway 103 to the network 108.

The bus 406 is connected to the above elements, and transmits address signals, data signals, and various control signals, etc.

(Hardware Configuration of Information Terminal)

Figure 5:
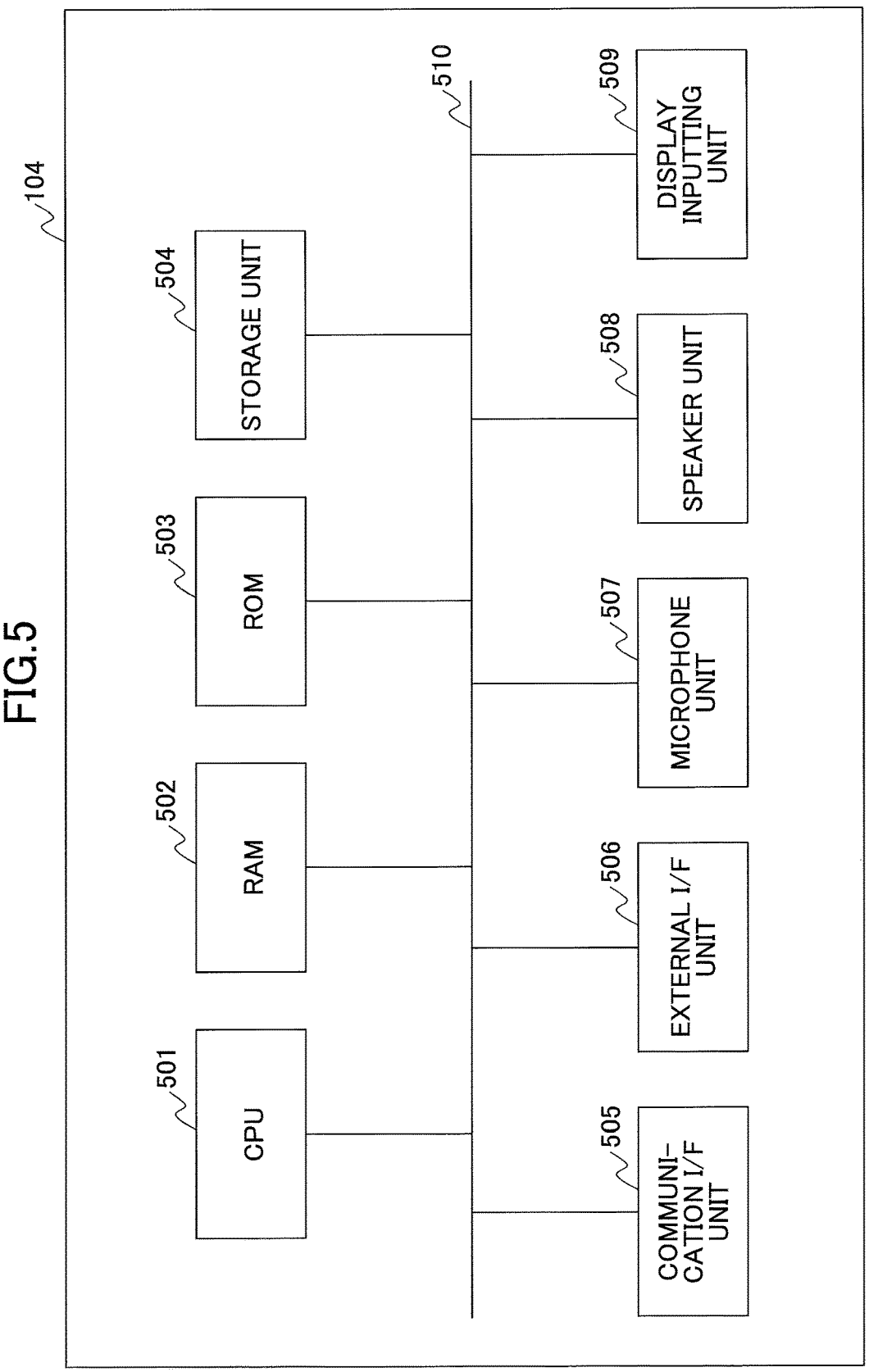
FIG. 5 is a block diagram illustrating an example of a hardware configuration of an information terminal according to an embodiment of the present disclosure.

FIG. 5 is a block diagram illustrating an example of a hardware configuration of the information terminal 104 according to an embodiment of the present disclosure. The information terminal 104 has a configuration of a general-purpose computer, and includes, for example, a CPU 501, a RAM 502, a ROM 503, a storage unit 504, a communication I/F unit 505, an external I/F unit 506, a microphone unit 507, a speaker unit 508, a display inputting unit 509, and a bus 510, etc.

The CPU 501 (example of processing circuitry) is an arithmetic device for implementing various functions of the information terminal 104, by loading the programs and data stored in the ROM 503 and the storage unit 504, etc., into the RAM 502, and executing processes. The RAM 502 is a volatile memory used as a work area, etc., of the CPU 501. The ROM 503 is a non-volatile memory for holding programs and data even after the power is turned off.

The storage unit 504 is a storage device such as a HDD, a SSD, and a flash ROM, etc., and stores an OS, an application program, and various kinds of data, etc.

The communication I/F unit 505 is a communication interface corresponding to a communication method such as a mobile communication network including 3rd Generation (3G) and Long Term Evolution (LTE), etc., and a wireless LAN, etc. The information terminal 104 performs data communication with the management server 101, etc., by connecting to the network 108, via the communication I/F unit 505.

The external I/F unit 506 is an interface between the information terminal 104 and an external device. The external device includes, for example, a recording medium. The information terminal 104 is able to read and/or write data from/in the recording medium, via the external I/F unit 506. For example, the recording medium includes a memory card and a USB memory, etc.

The microphone unit 507 includes a sound collecting element such as a microphone, etc. The microphone unit 507 converts the acoustic waves acquired by the microphone, etc., into electric signals, and further converts the electric signals into acoustic wave data having a predetermined format. Microphones provided in smartphones, etc., of recent years are capable of collecting acoustic waves of 20 kHz, and up to approximately 24 kHz in a more preferable example. Therefore, the microphone unit 507 the is able to appropriately acquire information converted into a high frequency of, for example, higher than or equal to 16 kHz, included in acoustic waves output from the output device 102.

The speaker unit 508 includes a voice sound output element such as a speaker, etc. The speaker unit 508 converts voice sound data into voice sound signals, and further converts the voice sound signals into acoustic waves by the speaker, etc., and outputs the acoustic waves.

The display inputting unit 509 includes, for example, a display element such as a Liquid Crystal Display (LCD), etc., and an element used for input such as a touch panel, etc., and accepts input operations by a user and displays a display screen by a program executed by the information terminal 104.

The bus 510 is connected to the above elements, and transmits address signals, data signals, and various control signals, etc.

Note that the information terminal 104 is able to execute applications, by installing, in the information terminal 104, programs stored in a recording medium connected to the external I/F unit 506 and applications downloaded via the communication I/F unit 505.

(Hardware Configuration of Display Device)

Figure 6:
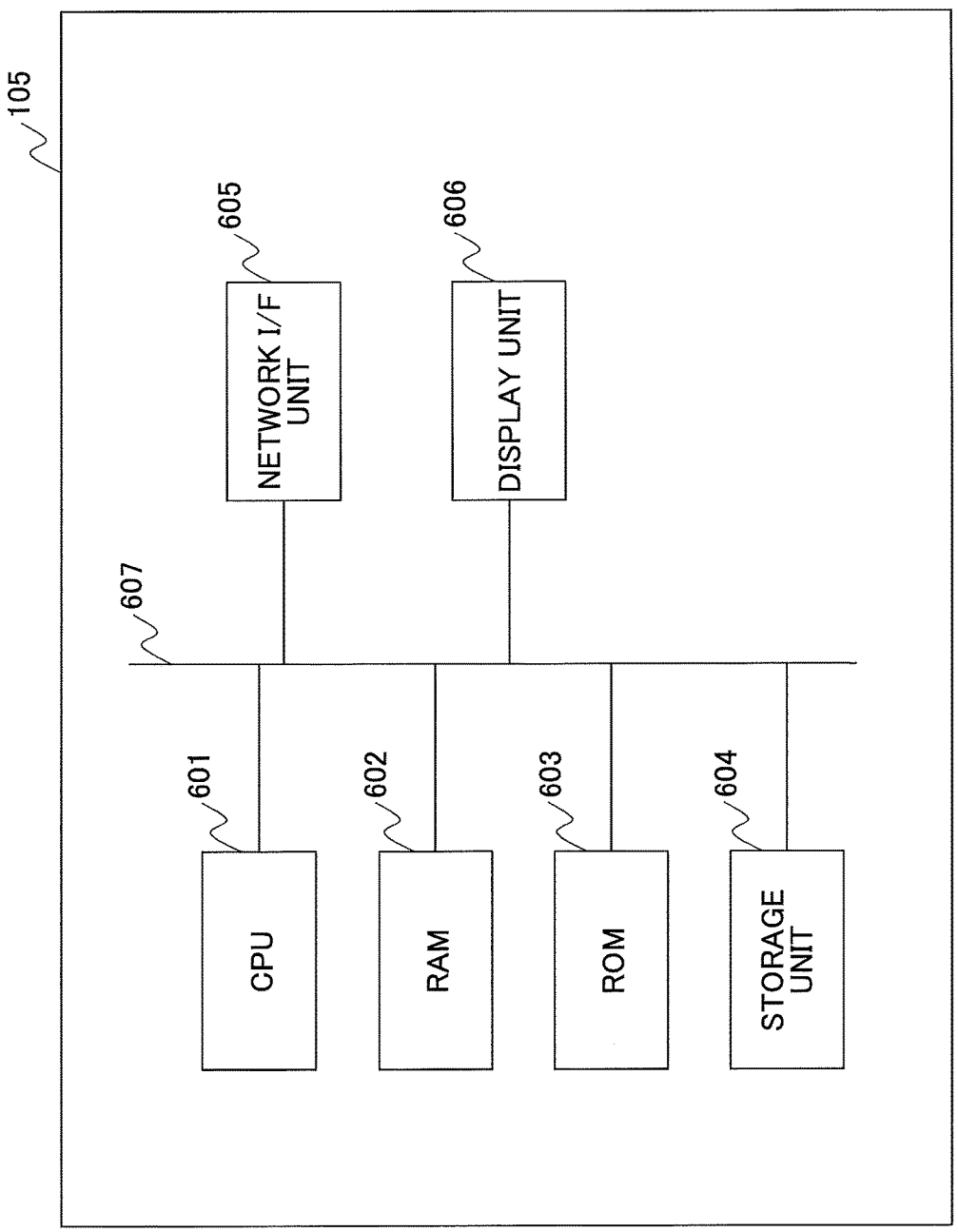
FIG. 6 is a block diagram illustrating an example of a hardware configuration of a display device according to an embodiment of the present disclosure.

FIG. 6 is a block diagram illustrating an example of a hardware configuration of the display device 105 according to an embodiment of the present disclosure. The display device 105 includes, for example, a CPU 601, a RAM 602, a ROM 603, a network I/F unit 605, a display 606, and a bus 607. Furthermore, the display device 105 may also include a storage unit 604.

The CPU 601 (example of processing circuitry) is an arithmetic device for implementing various functions of the display device 105, by executing programs stored in the ROM 603, etc. The RAM 602 is a volatile memory used as a work area, etc., of the CPU 601. The ROM 603 is a non-volatile memory for storing programs for the display device 105. The ROM 603 may be a rewritable volatile memory, such as a flash ROM and an EEPROM, etc.

The storage unit 604 is a storage device such as a HDD, a SSD, and a flash ROM, etc., and stores, for example, a plurality of content data items (display images, etc.) to be displayed by the display unit 606.

The network I/F unit 605 is a communication interface such as a wired/wireless LAN, etc., for connecting the display device 105 to the network 108.

The display unit 606 is a display device for displaying images. For example, when the display device 105 is a display, the display unit 606 includes a display element such as a LCD panel, etc., and a backlight, etc. Furthermore, when the display device 105 is a projector, the display device 105 includes a light source, a display element, and a projection lens, etc., for projecting images.

The bus 607 is connected to the above elements, and transmits address signals, data signals, and various control signals, etc.

<Functional Configuration>

Next, a description is given of a functional configuration of the information providing system 100.

FIG. 7 is a block diagram of a functional configuration of the information providing system 100 according to an embodiment of the present disclosure. In FIG. 7, the information providing system 100 includes the management server 101, the output device 102, the gateway 103, the information terminal 104, and the display device 105, etc.

Furthermore, the information providing system 100 according to the present embodiment causes the display device 105 to display information, for example, by using a plurality of display information items (content data) stored in advance. The plurality of display information items may be stored in advance by the management server 101, or may be acquired from an external content server 750, etc. Furthermore, as another example, the plurality of display information items may be stored in advance by the display device 105, etc.

FIG. 7 illustrates an example where the information providing system 100 acquires display information from the external content server 750.

(Functional Configuration of Management Server)

The management server 101 (information processing apparatus) 101 includes a communicating unit 701, a position information managing unit 702, a registration information managing unit 703, a correspondence information managing unit 704, a position information identifying unit 705, a display control unit 706, a display information acquiring unit 707, and a storage unit 708, etc.

The communicating unit 701 connects the management server 101 to the network 108, and communicates with the gateway 103, the information terminal 104, and the display device 105, etc. For example, the communicating unit 701 functions as a receiving unit for receiving transmission source information, etc., including information of the transmission source and information of the output device 102 acquired by the transmission source, from the transmission source capable of communicating with the management server 101. Furthermore, the communicating unit 701 functions as a sending unit for sending a display request, etc., by which the display control unit 706 of the management server 101 requests the display device 105 to display information. Furthermore, the communicating unit 701 sends and receives various kinds of data with, for example, the output device 102 and the content server 750, etc. Note that the communicating unit 701 is realized by, for example, the network I/F unit 208 of FIG. 2 and programs, etc., operating in the CPU 201 of FIG. 2.

The position information managing unit 702 acquires information of the transmission source (application ID, etc.) and information of the output device 102 acquired by the transmission source, from the transmission source (the information terminal 104 or an application operating in the information terminal 104) capable of communicating with the management server 101, via the communicating unit 701. Note that the information of the output device 102 acquired by the transmission source includes, for example, an output device ID that is identification information of the output device 102 and position information indicating the location where the output device 102 is installed, etc. Here, in the following description, it is assumed that the information of the output device 102 includes an output device ID of the output device 102.

Furthermore, the position information managing unit 702 stores position information 709 stored in the storage unit 708. The position information managing unit 702 is realized by, for example, programs, etc., operating in the CPU 201 of FIG. 2.

The position information identifying unit 705 identifies the position of the transmission source, based on information received from the transmission source by the position information managing unit 702, and position information 709 stored by the position information managing unit 702. The position information identifying unit 705 is realized by, for example, programs, etc., operating in the CPU 201 of FIG. 2.

Here, a description is given of examples of information (position information 709) stored by the position information managing unit 702, and information identified by the position information identifying unit 705.

FIGS. 8A through 8C are diagrams illustrating examples of information stored by the position information managing unit 702 according to an embodiment of the present disclosure.

FIG. 8A illustrates an example of position information 801 of output devices. The position information 801 stores output device IDs of a plurality of output devices 102 and information indicating the positions where the plurality of output devices 102 are installed, in association with each other.

FIG. 8B illustrates an example of position information 802 of display devices. The position information 802 stores information of display devices corresponding to the respective positions where the plurality of output devices 102 are installed. In the example of FIG. 8B, as an example of the information of display devices, a display device ID for identifying the display device 105 and an IP address, which is an example of address information of the display device 105, are stored.

Preferably, the position information managing unit 702 stores arrangement information as illustrated in FIG. 8C. In the example of FIG. 8C, the arrangement information includes information of the floor layout of a building 107, etc., the positions where the output devices 102 are installed (spot 1, spot 2, and so on), the positions where the display devices 105 are arranged, and display device IDs, etc.

Note that spot 1, spot 2, and so on are an example of information indicating the positions where the output devices 102 are installed. The information indicating the positions where the output devices 102 are installed may be, for example, information of areas corresponding to the output devices 102 (for example, an area A and an area B in FIG. 1, etc.), or coordinate information (for example, latitude and longitude) in a predetermined coordinate system, etc.

FIG. 9 is a diagram illustrating an example of information identified by the position information identifying unit 705 according to an embodiment of the present disclosure. The "identification information of transmission source" is information (application ID, etc.) of the transmission source received from the transmission source by the position information managing unit 702. The "output device ID" is the output device ID included in the information of the output device received from the transmission source by the position information managing unit 702. The "acquisition time and date" is information of the time and date at which the position information managing unit 702 has received the "identification information of transmission source" and the "output device ID".

The "position" is information indicating the position of the transmission source identified based on the position information of the output device illustrated in FIG. 8A and the "output device ID". For example, the transmission source corresponding to the identification information of transmission source "AP0002" in FIG. 9 has acquired an output device ID "SP0002". Therefore, the position information identifying unit 705 is able to determine that the transmission source corresponding to the identification information of transmission source "AP0002" is near the "spot 2", based on the position information of the output device of FIG. 8A.

The "display device ID" is the display device ID of the display device 105 corresponding to the "position" described above. The position information identifying unit 705 is able to identify that the display device 105 corresponding to the display device ID "DP0001" is installed at the position "spot 2", based on the position information of the display device in FIG. 8B. Furthermore, the "IP address" is the IP address of the display device 105 corresponding to the "display device ID" described above.

As described above, the position information identifying unit 705 is able to identify the position of the transmission source based on the information received by the position information managing unit 702 and the position information 709 stored by the position information managing unit 702.

Here, referring back to FIG. 7, the description of the functional configuration of the management server 101 is continued.

The registration information managing unit 703 is a unit for storing registration information 710 corresponding to identification information of the transmission source (application ID, etc.), and is realized by, for example, programs, etc., operating in the CPU 201 of FIG. 2. Note that the registration information is described below with reference to FIGS. 10A through 11B.

The correspondence information managing unit 704 is a unit for storing, for example, correspondence information 711 for identifying the display information (content data) corresponding to the information of the transmission source, and is realized by, for example, programs, etc., operating in the CPU 201 of FIG. 2.

Here, a description is given of the registration information 710 and the correspondence information 711.

FIGS. 10A and 10B are diagrams illustrating examples of the registration information 710 and the correspondence information 711 according to an embodiment of the present disclosure. Note that in the present embodiment, in the following description, it is assumed that the identification information of the transmission source is the application ID described above.

FIG. 10A illustrates an example of the registration information 710 stored by the registration information managing unit 703. In the example of FIG. 10A, in the registration information 710, information items of the user, such as "user name", "area of interest", "gender", and "inhabited area", etc., are stored in association with the application ID that is identification information 1001 of the transmission source.

In the example of FIG. 10A, when the user of the information terminal 104 installs the application corresponding to the information providing system 100 in the information terminal 104 and activates the application, the application generates an application ID for uniquely identifying the user. The application is able to generate a unique application ID based on the International Mobile Equipment Identity (IMEI) and the phone number, etc., of the information terminal 104.

Furthermore, the user registers usage of the application when the application is activated for the first time, etc. At this time, for example, it is assumed that the user registers information of the user as illustrated in FIG. 10A. The "user name" is name information such as the registration name of the user, etc. The "area of interest" is information indicating the area that the user is interested in. The "gender" is information indicating the gender of the user. The "inhabited area" is information indicating the area in which the user lives. Note that the information of the user in FIG. 10A is merely one example.

FIG. 10B illustrates an example of the correspondence information 711 stored by the correspondence information managing unit 704. In the correspondence information 711, information of the display information (content) to be provided to the transmission source is stored in association with the information of the transmission source, such as an application ID or registration information corresponding to the application ID (for example, "area of interest"). The correspondence information 711 is assumed to be set in advance by, for example, the administrator of the management server 101 or a service provider, etc.

In the example of FIG. 10B, in the correspondence information 711, information items such as "position", "time", "content name", "content ID", and "acquisition destination", etc., are stored in association with "area of interest", which is one of the registration information items.

The "position" is information used when providing different kinds of display information according to the position of the transmission source, and corresponds to the information of "position" in FIGS. 8A and 8B.

The "time" is information used when providing display information that changes with time. The "content name" is information indicating the name of the display information. The "content ID" is identification information for uniquely identifying each display information item. The "acquisition destination" is information indicating the acquisition destination of the display information, such as a Uniform Resource Locator (URL), etc.

In the registration information 710 of FIG. 10A, for example, the area of interest of the transmission source having the identification information (application ID) of "AP0001", is "shopping". For example, when this transmission source is at "spot 2" at the time "10:00", "information of store 1" is displayed on the display device 105 corresponding to spot 2, based on the correspondence information 711 illustrated in FIG. 10B.

Furthermore, at the same time, when the transmission source having the identification information of "AP0001" moves to "spot 3", "information of store 2" is displayed on the display device 105 corresponding to spot 3, based on the correspondence information 711 illustrated in FIG. 10B.

Similarly, in the registration information 710 of FIG. 10A, for example, the area of interest of the transmission source having the identification information (application ID) of "AP0002", is "business". When this transmission source is at any one of "spot 2", "spot 3", "spot 4" "spot 6", "spot 7", and "spot 8" at the time "0:20", "train operation information" is displayed on the display device 105 corresponding to spot where this transmission source is, based on the correspondence information 711 illustrated in FIG. 10B. Furthermore, when the time passes "0:30", "accommodation information" is displayed on the display device 105 corresponding to spot where this transmission source is, based on the correspondence information 711 illustrated in FIG. 10B.

Note that the correspondence information 711 of FIG. 10B is one example. For example, the correspondence information 711 may not necessarily include the item of "position" or the item of "time", etc. Furthermore, in the correspondence information 711, information items such as "position", "time", "content name", "content ID", and "acquisition destination", etc., may be stored in association with "gender" or "inhabited area", which are the registration information items, instead of being stored in association with "area of interest".

FIGS. 11A and 11B are diagrams illustrating other examples of the registration information 710 and the correspondence information 711 according to an embodiment of the present disclosure.

FIG. 11A illustrates another example of the registration information 710 stored by the registration information managing unit 703. In FIG. 11A, in the registration information 710, information of the application type indicating the type of application is stored in association with the application ID that is identification information 1101 of the transmission source.

In the example of FIG. 11A, it is assumed that the application operating in the information terminal 104 used by the user has an application ID that is common identification information with respect to each type of application. Accordingly, the information providing system 100 is able to identify the application type of the application operating in the information terminal 104, based on the application ID received from the transmission source.

FIG. 11B illustrates another example of the correspondence information 711 stored by the correspondence information managing unit 704. In the correspondence information 711, information of the display information (content) to be provided to the transmission source is stored in association with the application type corresponding to the information of the transmission source (application ID). The correspondence information 711 is assumed to be set in advance by, for example, the administrator of the management server 101 or a service provider, etc.

In the registration information 710 of FIG. 11A, for example, the application type of the transmission source having the identification information (application ID) of "AP0001", is "map". When this transmission source is at "spot 4" at the time "9:00", "bus station information" is displayed on the display device 105 corresponding to spot 4, based on the correspondence information 711 illustrated in FIG. 11B.

Furthermore, at the same time, when the transmission source having the identification information of "AP0001" moves to "spot 3", "floor guide" is displayed on the display device 105 corresponding to spot 3, based on the correspondence information 711 illustrated in FIG. 11B.

As described above, the configurations of the registration information 710 and the correspondence information 711 may have various applications and modifications.

Here, referring back to FIG. 7, the description of the functional configuration of the management server 101 is continued.

The display information acquiring unit 707 (first acquiring unit) acquires display information to be displayed on the display device 105 corresponding to the position of the transmission source, based on the information (information of transmission source and information of the output device 102 acquired by the transmission source) received by the position information managing unit 702. The display information acquiring unit 707 is realized by, for example, programs, etc., operating in the CPU 201 of FIG. 2. The display information acquiring unit 707 identifies the display information corresponding to the transmission source, based on the registration information 710 and the correspondence information 711 illustrated in FIGS. 10A through 11B and information received by the position information managing unit 702, etc.

For example, it is assumed that the information received by the position information managing unit 702 at the time "10:00" includes the application ID "AP0001" of the transmission source and the output device ID "SP0002" acquired by the transmission source. In this case, for example, the display information acquiring unit 707 identifies that the application type of the transmission source is "map", based on the registration information 710 of FIG. 11A. Furthermore, for example, the display information acquiring unit 707 identifies that the position of the transmission source is "spot 2", based on the position information of the output devices of FIG. 8A. Furthermore, for example, the display information acquiring unit 707 identifies that the content ID of the display information corresponding to the application type "map", the position "spot 2", and the time "10:00" is "MID0001", and that the acquisition destination of the display information is "URL21", based on the correspondence information 711 of FIG. 11B. Accordingly, the display information acquiring unit 707 is able to acquire the display information of the content ID "MID0001", from the acquisition destination "URL21".

The display control unit 706 is a unit for causing the display device 105 corresponding to the position of the transmission source to display the display information acquired by the display information acquiring unit 707, and is realized by, for example, programs, etc., operating in the CPU 201 of FIG. 2. For example, the display control unit 706 acquires the IP address (example of address information) of the display device 105 corresponding to the position of the transmission source, based on the information identified by the position information identifying unit 705 as illustrated in FIG. 9. Furthermore, the display control unit 706 sends a display request requesting to display the display information acquired by the display information acquiring unit 707, to the acquired IP address.

The storage unit 708 is a unit for storing information such as the position information 709, the registration information 710, and the correspondence information 711, etc., and is realized by, for example, the storage unit 204 of FIG. 2 and programs, etc., operating in the CPU 201 of FIG. 2. Furthermore, the storage unit 708 may store at least some of the plurality of display information items 712, in place of the content server 750.

(Functional Configuration of Output Device)

The output device 102 includes a wireless communicating unit 721, a signal outputting unit 722, and a device information storage unit 723.

The wireless communicating unit 721 is a unit for performing wireless communication with the gateway 103, and is realized by, for example, the wireless communicating unit 304 of FIG. 3 and programs, etc., operating in the CPU 301 of FIG. 3. The output device 102 is able to transmit and receive data with the management server 101 via the gateway 103, by the wireless communicating unit 721.

The signal outputting unit 722 outputs signals including information of the output device 102 (for example, an output device ID and position information of the output device, etc.). In the following description, it is assumed that in the present embodiment, the signal outputting unit 722 outputs acoustic waves including an output device ID of the output device 102. Note that the signal outputting unit 722 is realized by, for example, the acoustic wave control unit 305 and the acoustic wave outputting unit 306 of FIG. 3, and programs, etc., operating in the CPU 301 of FIG. 3.

The device information storage unit 723 stores information such as an output device ID that is included in acoustic waves and output by the signal outputting unit 722 and position information of the output device. The device information storage unit 723 is realized by, for example, the flash ROM 303, etc., of FIG. 3.

The information such as the output device ID, etc., stored by the device information storage unit 723 may be information that is stored in the output device 102 in advance, or information that is specified by the management server 101.

(Functional Configuration of Information Terminal)

The information terminal 104 includes a communicating unit 731, a signal acquiring unit 732, an information extracting unit 733, an identification information sending unit 734, an identification information storage unit 735, a display control unit 736, and an operation accepting unit 737, etc.

The communicating unit 731 is a unit for connecting the information terminal 104 to the network 108 and communicating with the management server 101, etc. The communicating unit 731 is realized by, for example, the communication I/F unit 505 of FIG. 5 and programs, etc., operating in the CPU 501 of FIG. 5.

The signal acquiring unit 732 is a unit for acquiring acoustic waves (example of signals) output from the output device 102, and is realized by, for example, the microphone unit 507 of FIG. 5 and programs, etc., operating in the CPU 501 of FIG. 5.

The information extracting unit 733 is a unit for extracting information included in acoustic waves acquired by the signal acquiring unit 732, and is realized by, for example, programs, etc., operating in the CPU 501 of FIG. 5. For example, the information extracting unit 733 extracts an output device ID, etc., of the output device 102 included in the acoustic waves acquired by the signal acquiring unit 732.

The identification information sending unit 734 sends identification information (application ID, etc.) of a transmission source stored in the identification information storage unit 735 and output device ID of the output device 102 extracted by the information extracting unit 733, to the management server 101 via the communicating unit 731. The identification information sending unit 734 is realized by, for example, programs, etc., operating in the CPU 501 of FIG. 5.

The identification information storage unit 735 stores identification information of a transmission source that is the information terminal 104, such as an application ID. An application ID is identification information of an application that is generated, for example, when the application is initially installed, etc., by the application for the information providing system 100 operating in the information terminal 104. The application operating in the information terminal 104 generates an application ID unique to each information terminal 104, based on, for example, identification information of the information terminal 104 such as unique information including an international mobile equipment identifier (IMEI), etc. Alternatively, the application operating in the information terminal 104 may generate an application ID by another method.

Furthermore, in another example, the application ID is used as information indicating a common application type with respect to each application. In this case, the application includes the application ID, and therefore the identification information storage unit 735 does not have to store an application ID.

The display control unit 736 causes, for example, the display inputting unit 509, etc., of FIG. 5 to display a display screen of an application operating in the information terminal 104. The display control unit 736 is realized by, for example, programs, etc., operating in the CPU 501 of FIG. 5.

The operation accepting unit 737 accepts an input operation of a user to the display inputting unit 509 of FIG. 5, for example. The operation accepting unit 737 is realized by, for example, programs, etc., operating in the CPU 501 of FIG. 5.

(Functional Configuration of Display Device)

The display device 105 includes, for example, a communicating unit 741, a display control unit 742, and a storage unit 743, etc.

The communicating unit 741 is a unit for connecting the display device 105 to the network 108 and performing communication with the management server 101, etc. The communicating unit 741 is realized by, for example, the network I/F unit 605 of FIG. 6 and programs, etc., operating in the CPU 601 of FIG. 6.

The display control unit 742 causes the display unit 606, etc., of FIG. 6, to display the display information, according to instructions by the management server 101. For example, when the display control unit 742 receives a display request instructing to display the display information from the management server 101 via the communicating unit 741, the display control unit 742 causes the display unit 606, etc., to display the display information included in the display request.

Furthermore, in another example, the display device 105 may store a plurality of display information items in the storage unit 743. In this case, when the display control unit 742 receives a display request from the management server 101 via the communicating unit 741, the display control unit 742 reads the display information corresponding to the content ID included in the display request from the storage unit 743. Then, the display control unit 742 causes the display unit 606, etc., to display displays the read display information.

Furthermore, in yet another example, when the display control unit 742 receives a display request from the management server 101 via the communicating unit 741, the display control unit 742 may acquire display information corresponding to the content ID included in the display request, from the content server 750, etc.

(Functional Configuration of Content Server)

The content server 750 is an example of a unit for storing a plurality of display information items, and includes, for example, a communicating unit 751, an information providing unit 752, and a display information storage unit 753, etc. The content server 750 may be a server device included in the information providing system 100, a server device outside the information providing system 100, or a server device provided by a cloud service, etc.

The communicating unit 751 is a unit for connecting the content server 750 to the network 108, and communicating with the management server 101, etc. The communicating unit 751 is realized by, for example, the network I/F unit 208 of FIG. 2 and programs, etc., operating in the CPU 201 of FIG. 2.

The information providing unit 752 manages a plurality of display information items (contents) in the display information storage unit 753 in association with a content ID that is identification information of each of the display information items. Furthermore, for example, the information providing unit 752 provides (sends) display information corresponding to the requested content ID to a request source, in response to a request to acquire display information from the request source such as the management server 101, etc. For example, the information providing unit 752 is realized by, for example, programs, etc., operating in the CPU 201 of FIG. 2.

The display information storage unit 753 is a unit for storing a plurality of display information items managed by the information providing unit 752, and the display information 753 is realized by, for example, the storage unit 204 of FIG. 2, etc.

<Process Flow>

Next, a description is given of flows of specific processes performed by the information providing system 100.

First Embodiment

Figure 12:
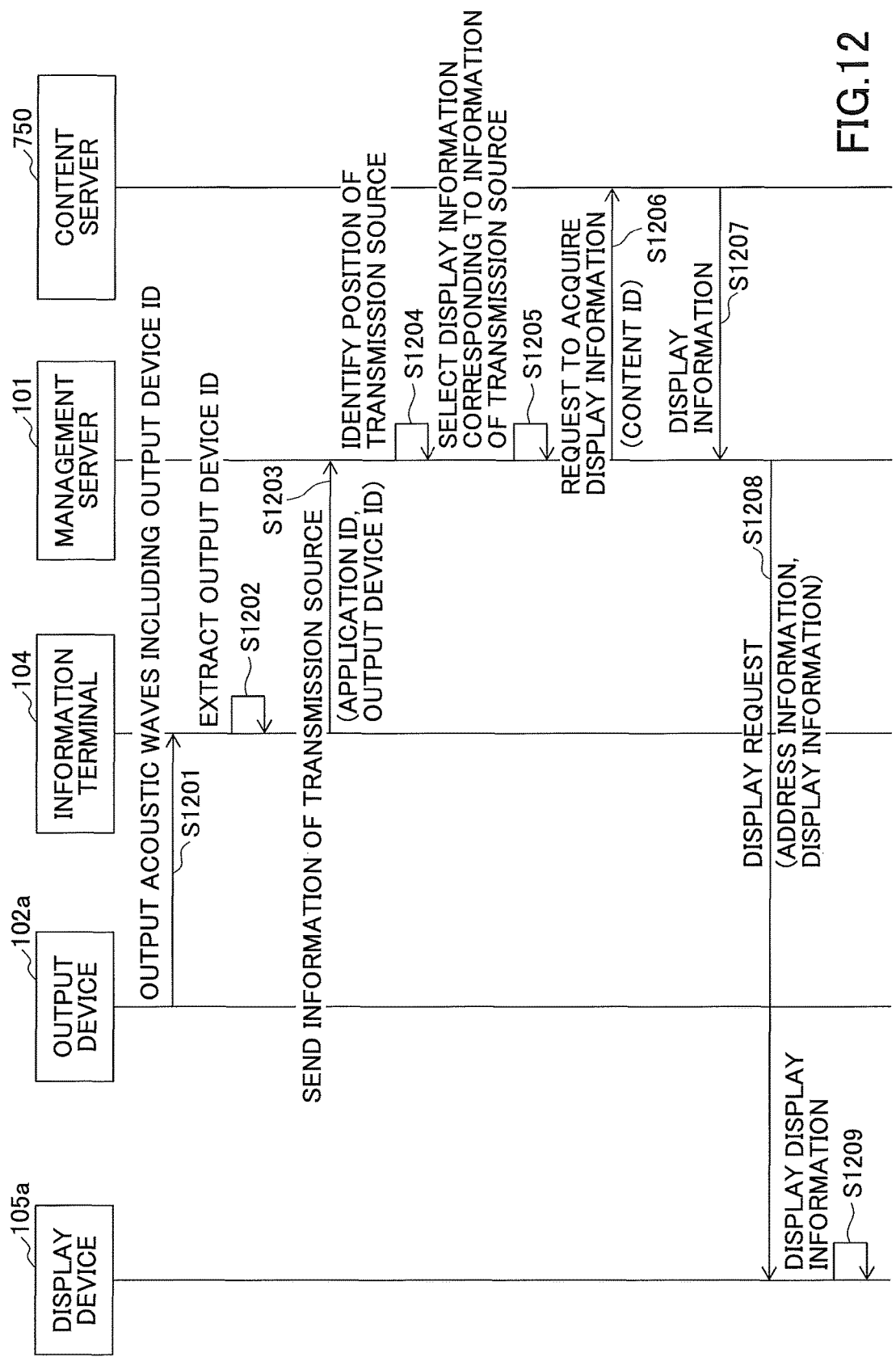
FIG. 12 is a sequence diagram of an example of a process performed by the information providing system according to a first embodiment of the present disclosure.

FIG. 12 is a sequence diagram of an example of a process performed by the information providing system 100 according to a first embodiment of the present disclosure. Here, the following description is given assuming that the user 106 and the information terminal 104 of the user are in the area A in the system configuration of FIG. 1.

In step S1201, the output device 102a outputs acoustic waves including an output device ID "SP0001" of the own device. Note that it is assumed that the output device 102a is continuously outputting acoustic waves including the output device ID of the own device.

In step S1202, the information extracting unit 733 of the information terminal 104 extracts the output device ID of the output device 102a included in the acoustic waves acquired by the signal acquiring unit 732.

In step S1203, the identification information sending unit 734 of the information terminal 104 sends information of the transmission source to the management server 101. The information of the transmission source includes the output device ID of the output device 102a extracted by the information extracting unit 733 and an application ID stored in the identification information storage unit 735. Note that the output device ID of the output device 102a is an example of information of the output device 102 acquired by the transmission source. Furthermore, the application ID stored in the identification information storage unit 735 is an example of information of the transmission source.

In step S1204, the communicating unit 701 of the management server 101 receives the information sent from the transmission source (the information terminal 104 or an application operating in the information terminal 104), and the position information managing unit 705 identifies the position of the transmission source based on the received information. The position information identifying unit 705 identifies information such as "position", "display device ID", and "IP address", etc., in FIG. 9, based on the information received from the transmission source.

In step S1205, the display information acquiring unit 707 of the management server 101 selects display information corresponding to the information of the transmission source. For example, the display information acquiring unit 707 uses the information received by the position information managing unit 702 and the registration information and correspondence information illustrated in FIGS. 10A through 11B, to identify information such as the content ID corresponding to the transmission source and the URL of the acquisition destination, etc.

In step S1206, the display information acquiring unit 707 of the management server 101 sends a request to acquire display information to, for example, the content server 750. The request to acquire display information includes the content ID that is the identification information for identifying the display information (content).

In step S1207, the display information acquiring unit 707 of the management server 101 acquires the display information sent from the content server 750.

In step S1208, the display control unit 706 of the management server 101 sends a display request requesting to display the display information acquired by the display information acquiring unit 707, to the display device 105a corresponding to the position of the transmission source identified in step S1204. The display request includes, for example, the address information (IP address, etc.) of the display device 105a and the display information.

In step S1209, the display control unit 742 of the display device 105a causes the display unit 606, etc., to display the display information included in the display request received from the management server 101 via the communicating unit 741.

By the above process, when the user 106 holding the information terminal 104 enters the area A of FIG. 1, the display information (content) corresponding to the transmission source (user 106, information terminal 104, or application, etc.) is displayed on the display device 105a. Similarly, when the user 106 holding the information terminal 104 enters the area B of FIG. 1, the display information corresponding to the transmission source is displayed on the display device 105b. Similarly, when the user 106 holding the information terminal 104 enters the area C of FIG. 1, the display information corresponding to the transmission source is displayed on the display device 105c.

Note that in the process illustrated in FIG. 12, a description is given of an example in which the management server 101 acquires the display information from the content server 750; however, the process is merely one example. The management server 101 may use other procedures as long as the display information corresponding to the transmission source is displayed on the display device 105 corresponding to the position of the transmission source.

Figure 13:
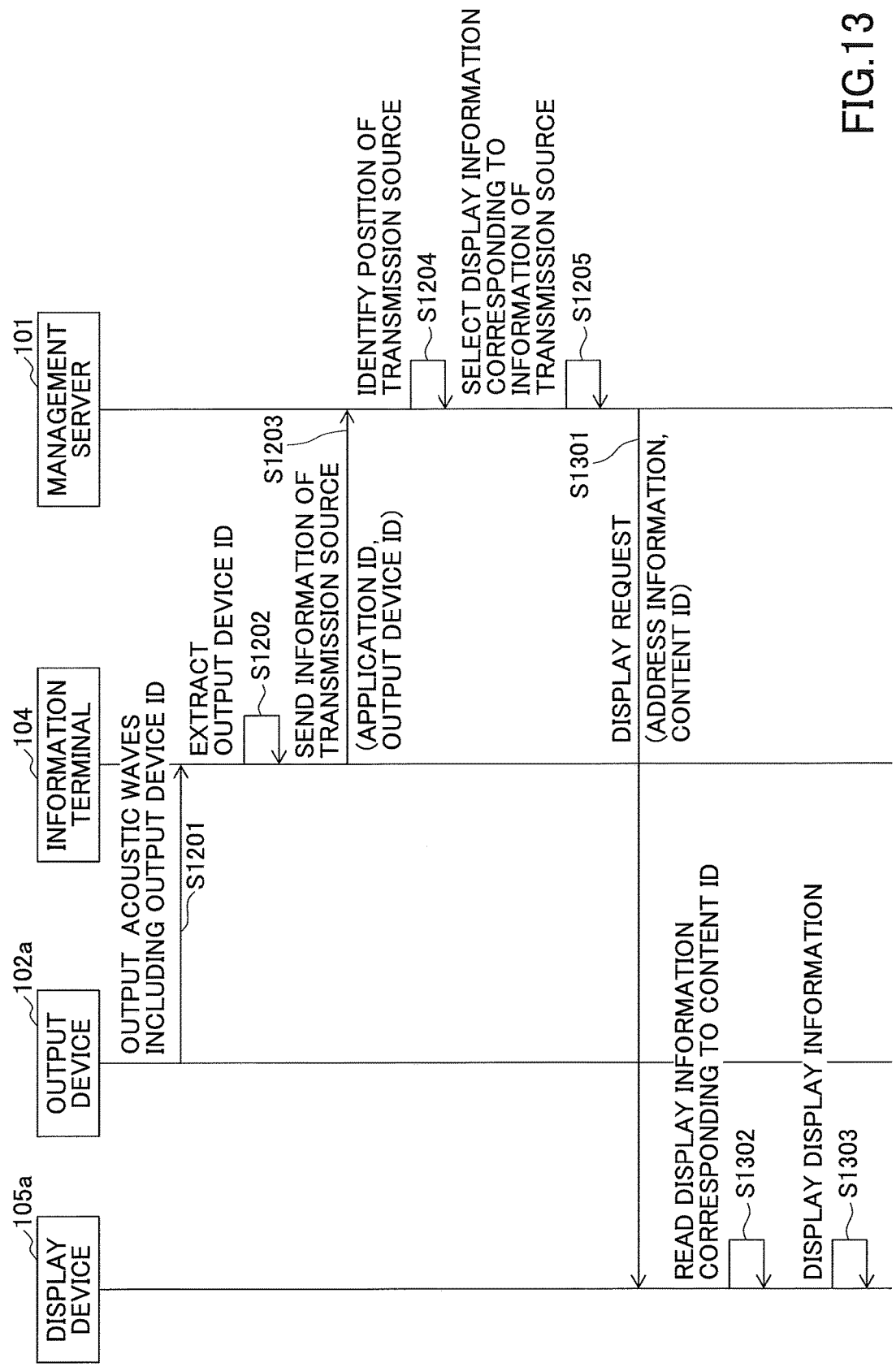
FIG. 13 is a sequence diagram of another example of a process performed by the information providing system according to the first embodiment of the present disclosure.

FIG. 13 is a sequence diagram of another example of a process performed by the information providing system 100 according to the first embodiment of the present disclosure.

Note that the processes of steps S1201 through S1205 are the same as the processes in FIG. 12, and therefore the processes that are different from the processes of FIG. 12 are mainly described.

In step S1301, the display control unit 706 of the management server 101 sends the display request requesting to display the display information identified in step S1205, to the display device 105a corresponding to the position of the transmission source. The display request includes, for example, address information of the display device 105a (IP address, etc.) and a content ID, etc., for uniquely identifying the display information.

In step S1302, the display control unit 742 of the display device 105a reads the display information corresponding to the content ID included in the display request received from the management server 101. Here, for example, a plurality of display information items may be stored in the storage unit 743 of the display device 105a, or may be stored in a storage server, etc., that can be used from a plurality of display devices 105. Alternatively, the display device 105a may include a function corresponding to the display information acquiring unit 707 of the management server 101, and may acquire display information corresponding to the content ID from the content server 750.

In step S1303, the display control unit 736 of the display device 105a causes, for example, the display unit 606, etc., to display the display information acquired in step S1302.

As described above, the information providing system 100 according to the present embodiment may have various system configurations.

Second Embodiment

In a second embodiment, a description is given of an example of a display method of display information, in a case where there are a plurality of transmission sources corresponding to a single display device 105.

<Functional Configuration>

Figure 14:
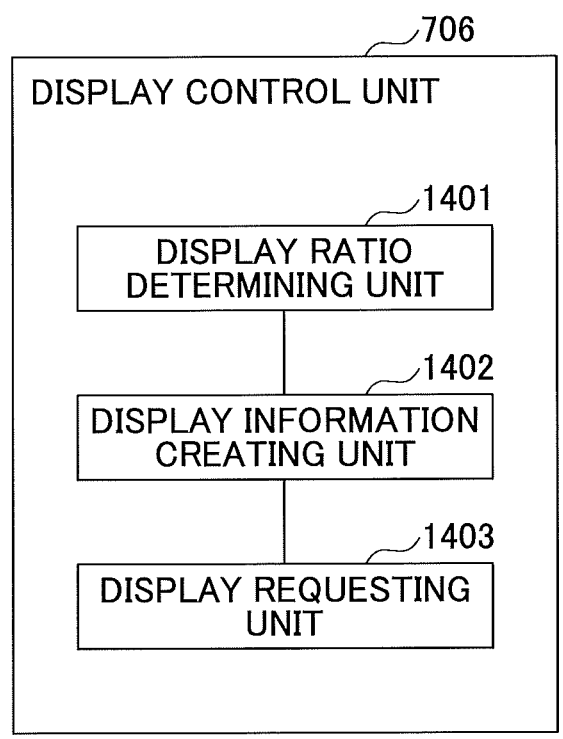
FIG. 14 is a block diagram of a functional configuration of a display control unit of the management server according to a second embodiment of the present disclosure.

FIG. 14 is a block diagram of a functional configuration of the display control unit 706 of the management server 101 according to the second embodiment of the present disclosure. The display control unit 706 according to the second embodiment includes a display ratio determining unit 1401, a display information creating unit 1402, and a display requesting unit 1403, etc.

The display ratio determining unit 1401 determines a display ratio of the display information corresponding to each transmission source, for example, when a plurality of transmission sources are detected in the area B in FIG. 1. Note that the display ratio of the display information is described below.

The display information creating unit 1402 creates display information based on the display ratio determined by the display ratio determining unit 1401. In the present embodiment, as described below, a plurality of display information items corresponding to a plurality of transmission sources are displayed in divided areas on a single display device 105. The display information creating unit 1402 creates, for example, display information for dividing and displaying the display information.

The display requesting unit 1403 sends a display request including the display information created by the display information creating unit 1402 to the display device 105, to cause the display device 105 to display the display information.

<Process Flow>

FIG. 15 is a flowchart illustrating a process flow of the management server 101 according to the second embodiment of the present disclosure. Note that the basic operations of the respective units of the management server 101 are the same as the operations of the first embodiment, and therefore the operations that are different from the operations of the first embodiment are mainly described.

In step S1501, the position information managing unit 702 of the management server 101 receives information (the application ID of transmission source and the output device ID acquired by the transmission source, etc.) sent from the transmission source.

In step S1502, the position information managing unit 702 repeats the process of step S1501 until a predetermined time (for example, 10 seconds) passes. Furthermore, when the predetermined time passes, the position information managing unit 702 shifts the process to step S1503.

In step S1503, the position information identifying unit 705 of the management server 101 identifies the position of the transmission source. Note that in the processes of steps S1501 and S1502, when information is received from a plurality of transmission sources, the position information identifying unit 705 identifies the respective positions of the plurality of transmission sources.

In step S1504, the display information acquiring unit 707 of the management server 101 acquires the display information corresponding to the transmission source. Note that when there are a plurality of display information items corresponding to the transmission source, the display information acquiring unit 707 acquires a plurality of display information items.

In step S1505, the management server 101 determines whether there are a plurality of display information items corresponding to a single display device 105. When there are no plural display information items corresponding to a single display device 105, the management server 101 shifts the process to step S1508. On the other hand, when there are a plurality of display information items corresponding to a single display device 105, the management server 101 shifts the process to step S1506.

When the process shifts to step S1506, the display ratio determining unit 1401 of the management server 101 determines the display ratio of each display screen.

In step S1507, the display information creating unit 1402 of the management server 101 creates a display screen to be displayed on the display device 105, based on the display ratio determined by the display ratio determining unit 1401.

In step S1508, the display requesting unit 1403 of the management server 101 sends a display request requesting to display the display information on the display device 105.

(Examples of Display Ratio and Display Information)

FIG. 16A is a diagram illustrating an example of a display ratio determined by the display ratio determining unit 1401 in step S1506 of FIG. 15.

The example of FIG. 16A indicates information (content ID and content name) relevant to a plurality of display information items to be provided to a plurality of transmission sources detected at a position "spot 2", and "number of transmission sources", "priority ranking", and "display ratio" corresponding to each of the display information items.

The "number of transmission sources" is the number of transmission sources to which the display information is to be provided. The "priority ranking" is information indicating the priority level of each display information item. The smaller the value of the priority level, the higher the priority level of the display information. Note that the priority level of each display information item is determined based on the "number of transmission sources". For example, as illustrated in FIG. 16A, the priority is sequentially assigned starting from the display information having a large number of transmission sources. Furthermore, the display information may be controlled based on the number of transmission sources by setting a value to be a threshold "n" in advance, such as "determine that there are many transmission sources when the number of transmission sources is higher than or equal to n".

For example, to the transmission source using an application of an application type "news" at a time "10:00" at a position "spot 2", the display information having a content ID "NID0001" is provided, based on the correspondence information of FIG. 11B. Furthermore, to the transmission source using an application of an application type "map" at a time "10:00" at a position "spot 2", the display information having a content ID "MID0001" is provided, based on the correspondence information of FIG. 11B. Similarly, to the transmission source using an application of an application type "weather" at a time "10:00" at a position "spot 2", the display information having a content ID "WID0001" is provided, based on the correspondence information of FIG. 11B.

The example of FIG. 16A indicates that at the position "spot 2", "3" is the number of transmission sources to which the content ID "NID0001" is provided, "2" is the number of transmission sources to which the content ID "MID0001" is provided, and "1" is the number of transmission sources to which the content ID "WID0001" is provided. Furthermore, the display ratio determining unit 1401 determines 3/6 as the display ratio of the content ID "NID0001", 2/6 as the display ratio of the content ID "MID0001", and 1/6 as the display ratio of the content ID "WID0001", based on the ratio of the "number of transmission sources".

Figure 16B:
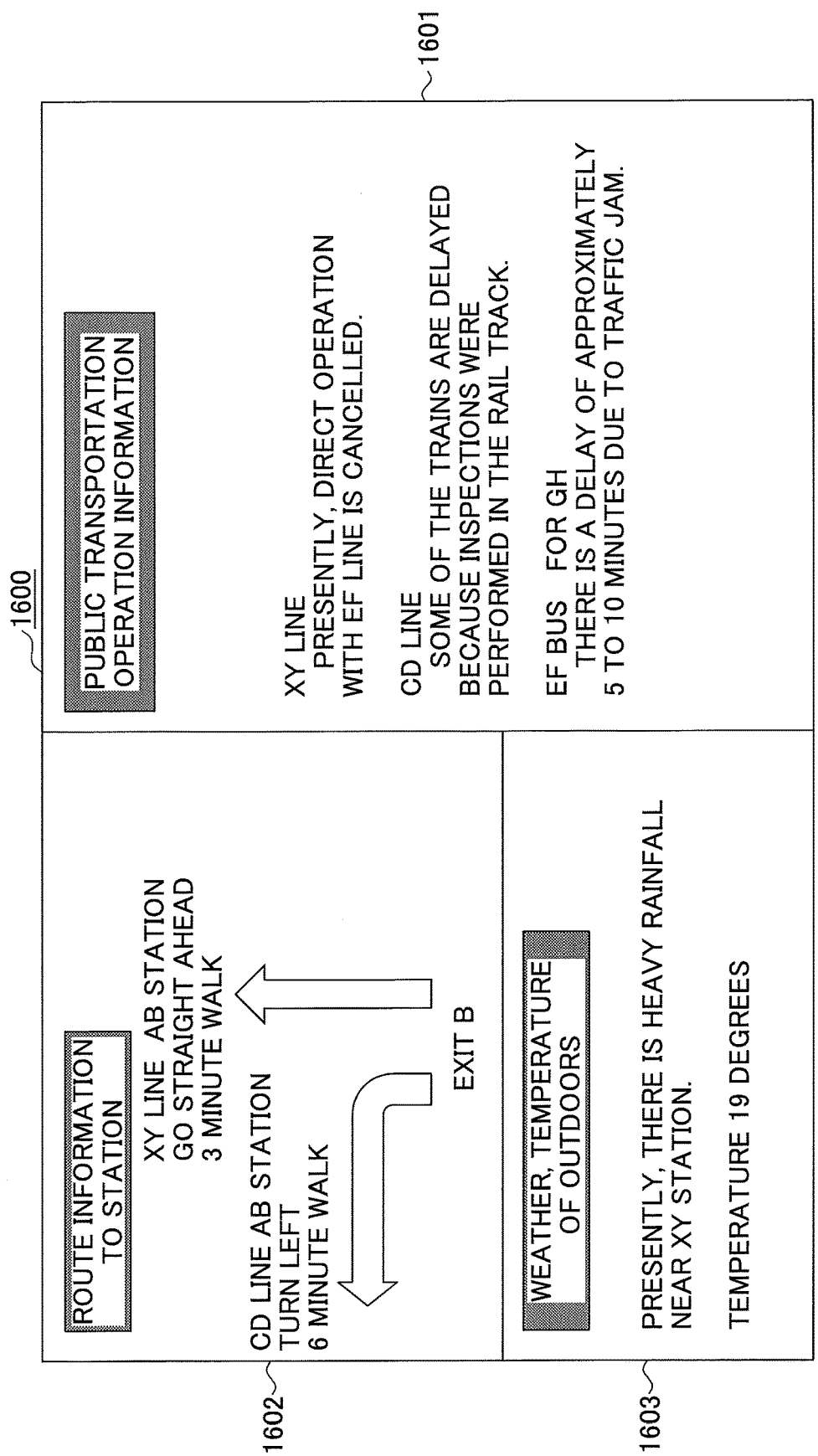

FIG. 16B is a diagram illustrating an example of display information created in step S1507 of FIG. 15. In the example of FIG. 16B, display information 1601 having the content ID "NID0001", display information 1602 having the content ID "MID0001", and display information 1603 having the content ID "WID0001" are arranged in display information 1600 in divided areas.

In FIG. 16B, the display information 1601 having the content ID "NID0001" is displayed in a display area corresponding to a display ratio of 3/6, which is determined by the display ratio determining unit 1401, among the entire display area of the display information 1600. Furthermore, the display information 1602 having the content ID "MID0001" is displayed in a display area corresponding to a display ratio of 2/6, which is determined by the display ratio determining unit 1401. Similarly, the display information 1603 having the content ID "WID0001" is displayed in a display area corresponding to a display ratio of 1/6, which is determined by the display ratio determining unit 1401. As described above, the display control unit 706 according to the present embodiment controls the sizes of the display areas for displaying the respective display information items, according to, for example, "number of transmission sources" in FIG. 16A.

Note that the method of determining the display ratio in FIG. 16A and the display information 1600 illustrated in FIG. 16B are merely examples.

As described above, the display control unit 706 according to the present embodiment controls the process of displaying the display information, according to the priority level and the number of transmission sources, etc., of the display information to be displayed on a single display device 105.

As described above, the information providing system 100 according to the present embodiment is capable of displaying a display information item, which has a higher priority level than other display information items, with higher priority than the other display information items (by a larger size in the example of FIG. 16B), when a plurality of transmission sources are detected to correspond to a single display device 105.

Third Embodiment

In the second embodiment, a description is given of an example of a case where a display information item having a higher priority level than other display information items, is displayed to have a larger size than the other display information items. In a third embodiment, a description is given of an example of a case where a display information item having a higher priority level than other display information items, is displayed sooner than the other display information items.

<Functional Configuration>

Figure 17:
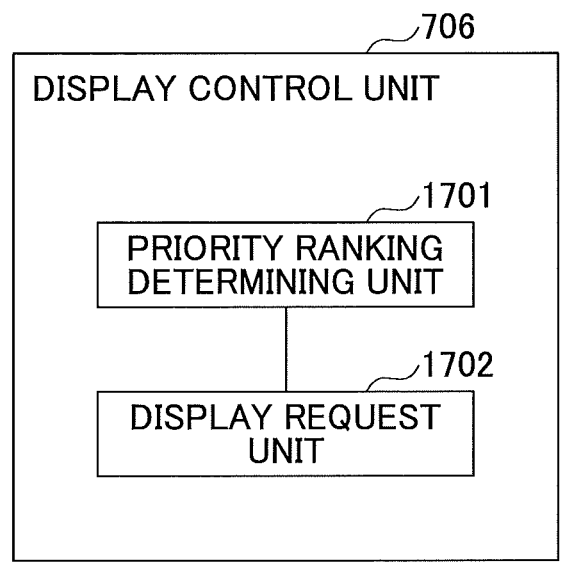
FIG. 17 is a block diagram of a functional configuration of the display control unit of the management server according to a third embodiment of the present disclosure.

FIG. 17 is a block diagram of a functional configuration of the display control unit 706 of the management server 101 according to the third embodiment of the present disclosure. The display control unit 706 according to the third embodiment includes a priority ranking determining unit 1701 and a display requesting unit 1702.

The priority ranking determining unit 1701 determines the priority ranking of the display information corresponding to each transmission source, for example, when a plurality of transmission sources are detected in the area B of FIG. 1. Note that the priority ranking of the display information is described below.

The display requesting unit 1702 sequentially requests the display device 105 to display the display information, staring from the display information having a high priority ranking determined by the priority ranking determining unit 1701.

<Process Flow>

Figure 18:
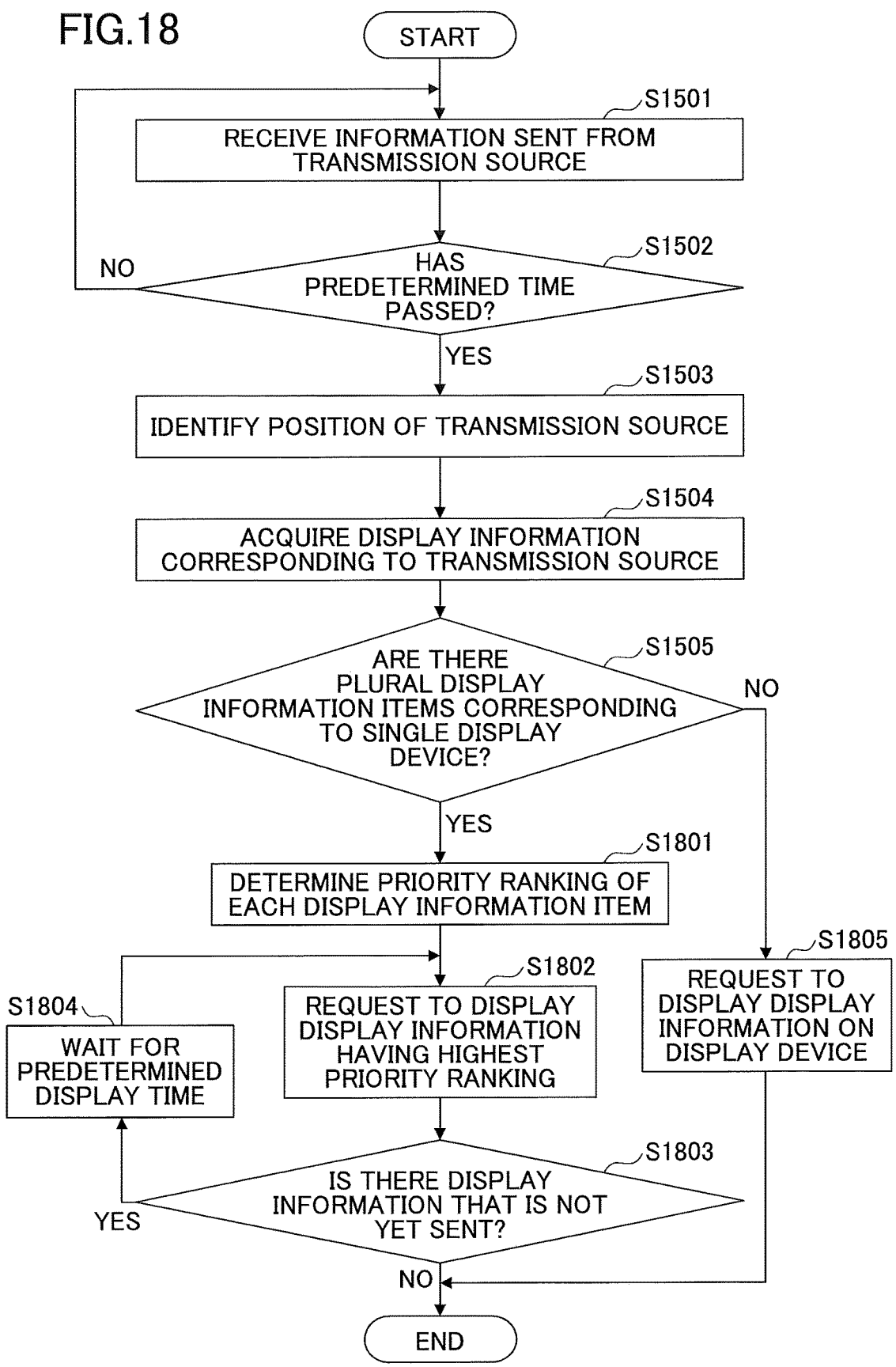
FIG. 18 is a flowchart illustrating a process flow of the management server according to the third embodiment of the present disclosure.

FIG. 18 is a flowchart illustrating a process flow of the management server 101 according to the third embodiment of the present disclosure. Note that the processes of steps S1501 through S1505 of FIG. 18 are the same as the processes of the second embodiment illustrated in FIG. 15, and therefore the processes that are different from the processes of the second embodiment are mainly described.

First, a description is given of a process in a case where it is determined that there are a plurality of display information items corresponding to a single display device 105 in step S1505.

In step S1801, the priority ranking determining unit 1701 of the management server 101 determines the priority ranking of each display information item.

In step S1802, the display requesting unit 1702 of the management server 101 sends a display request to display the display information having the highest priority ranking determined by the priority ranking determining unit 1701, among the display information items that are not sent, to the corresponding display device 105.

In step S1803, the display requesting unit 1702 determines whether there is any display information that is not sent. When there is display information that is not sent, in step S1804, the display requesting unit 1702 waits for a predetermined display time (for example, five seconds), and then executes the process of step S1802. On the other hand when there is no display information that is not sent, the display requesting unit 1702 ends the process.

Note that the process of waiting for a predetermined display time in step S1804 is one example. For example, the display requesting unit 1702 may include information of the display time in the display request and send the display request to the display device 105. In this case, the process of step S1804 can be omitted.

Furthermore, in step S1505, when it is determined that there are no plural display information items corresponding to a single display device 105, the display requesting unit 1702 sends a display request requesting to display the display information to the corresponding display device 105 in step S1805.

(Example of Priority Ranking of Display Information)

FIG. 19 is a diagram illustrating an example of a priority ranking determined by the priority ranking determining unit 1701 in step S1801 of FIG. 18.

The example of FIG. 19 indicates information (content ID and content name) relevant to a plurality of display information items to be provided to a plurality of transmission sources detected at a position "spot 2", and "number of transmission sources", "priority ranking", and "display time" corresponding to each of the display information items.

The example of FIG. 19 indicates that at the position "spot 2", "3" is the number of transmission sources to which the content ID "NID0001" is provided, "2" is the number of transmission sources to which the content ID "MID0001" is provided, and "1" is the number of transmission sources to which the content ID "WID0001" is provided. Furthermore, in the example of FIG. 19, the priority ranking determining unit 1701 determines "1" as the priority ranking of the content ID "NID0001", "2" as the priority ranking of the content ID "MID0001", and "3" as the priority ranking of the content ID "WID0001", in descending order according to the "number of transmission sources".

Furthermore, as indicated in the "display time" of FIG. 19, the priority ranking determining unit 1701 may determine the display time of each display information time based on the priority ranking, such as determining a longer display time as the priority ranking increases. Furthermore, when there is a large number of display information items to be displayed on a single display device 105, the priority ranking determining unit 1701 may set the "display time" of the display information having a low priority ranking as "0", and refrain from requesting to display the display information having a low priority ranking.

As described above, the display control unit 706 according to the present embodiment makes determinations based on the number of transmission sources relevant to a plurality of display information items to be displayed on a single display device 105. The display control unit 706 controls the order of displaying the display information and the time of displaying the display information, etc., according to the number of transmission sources.

As described above, the information providing system 100 according to the present embodiment is capable of sequentially displaying the display information items starting from the display information with higher priority (the display information corresponding to a large number of transmission sources in the example of FIG. 19), when a plurality of transmission sources are detected to correspond to a single display device 105.

Fourth Embodiment

The output device 102 or the function of the output device 102 of FIG. 1 may be included in the display device 105. In a fourth embodiment, a description is given of an example of a case where the display device 105 includes the output device 102 or the function of the output device 102.

<System Configuration>

Figure 20:
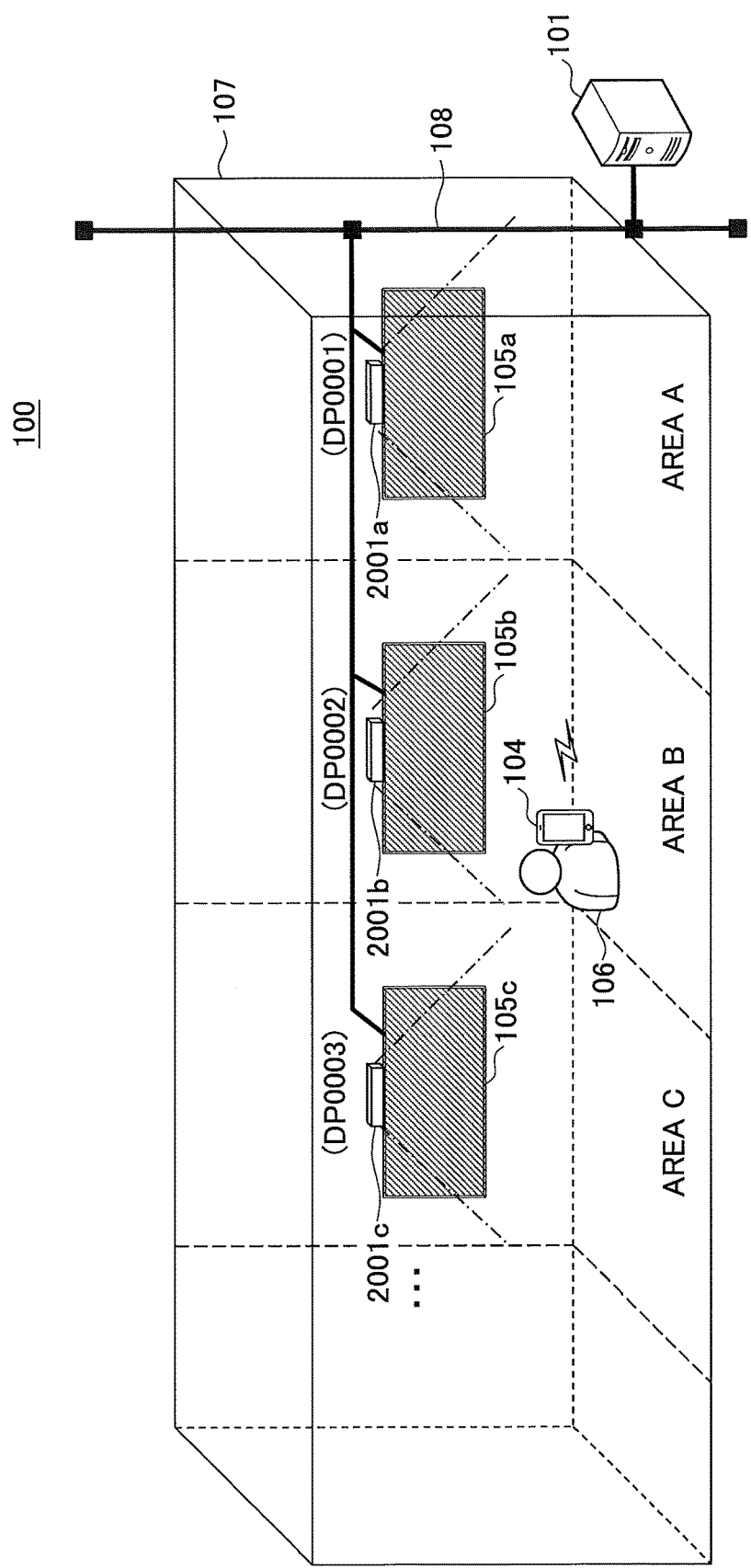
FIG. 20 is a diagram illustrating an example of a configuration of the information providing system according to a fourth embodiment of the present disclosure.

FIG. 20 is a diagram illustrating an example of a configuration of the information providing system 100 according to the fourth embodiment of the present disclosure. In FIG. 20, the display device 105a includes an output device 2001a for outputting the display device ID "DP0001" of the display device 105a. Furthermore, the display device 105b includes an output device 2001b for outputting the display device ID "DP0002" of the display device 105b. Similarly, the display device 105c includes an output device 2001c for outputting the display device ID "DP0003" of the display device 105c. Note that in the following description, "output device 2001" is used for referring to any one of the output devices 2001a through 2001c.

For example, it is assumed that the output device 2001a included in the display device 105a is outputting acoustic waves including the display device ID of the display device 105a, toward the front side (direction from which display screen can be seen) of the display device 105a. Similarly, the output device 2001b and the output device 2001c are assumed to be outputting acoustic waves including the display device ID of the corresponding display device 105, toward the front side of the display device 105.

<Hardware Configuration>

Figure 21:
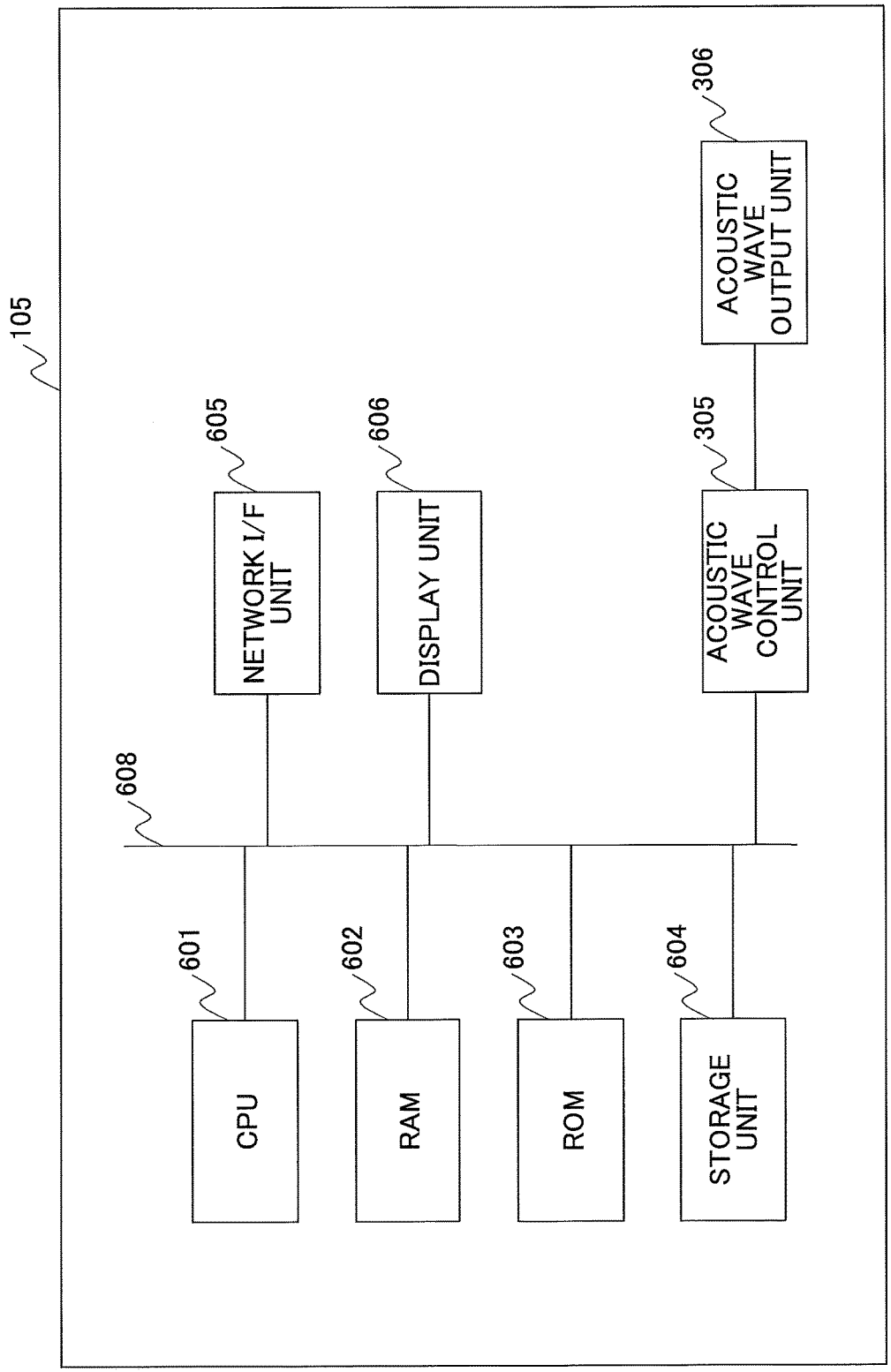
FIG. 21 is a block diagram illustrating an example of a hardware configuration of the display device according to the fourth embodiment of the present disclosure.

FIG. 21 is a block diagram illustrating an example of a hardware configuration of the display device 105 according to the fourth embodiment of the present disclosure. The display device 105 according to the present embodiment includes the acoustic wave control unit 305 and the acoustic wave outputting unit 306, in addition to the configuration of the display device 105 of FIG. 6.

The acoustic wave control unit 305 converts the information such as an output device ID, etc., stored in the flash ROM 303, into acoustic wave signals, and outputs the acoustic wave signals to the acoustic wave outputting unit 306.

The acoustic wave outputting unit 306 includes, for example, an electroacoustic transducer such as a speaker, etc., that converts the acoustic wave signals input from the acoustic wave control unit 305 into acoustic waves, and outputs the acoustic waves.

Note that the configuration other than the acoustic wave control unit 305 and the acoustic wave outputting unit 306 is the same as the configuration of the display device 105 illustrated in FIG. 6.

<Functional Configuration>

The functional configuration of the management server 101 according to the present embodiment is the same as the functional configuration of the management server 101 in the information providing system 100 illustrated in FIG. 7. However, the output device 2001 outputs the display device ID of the display device 105, and therefore the configuration of the position information 709 is partly different.

(Example of Position Information)

Figure 22B:
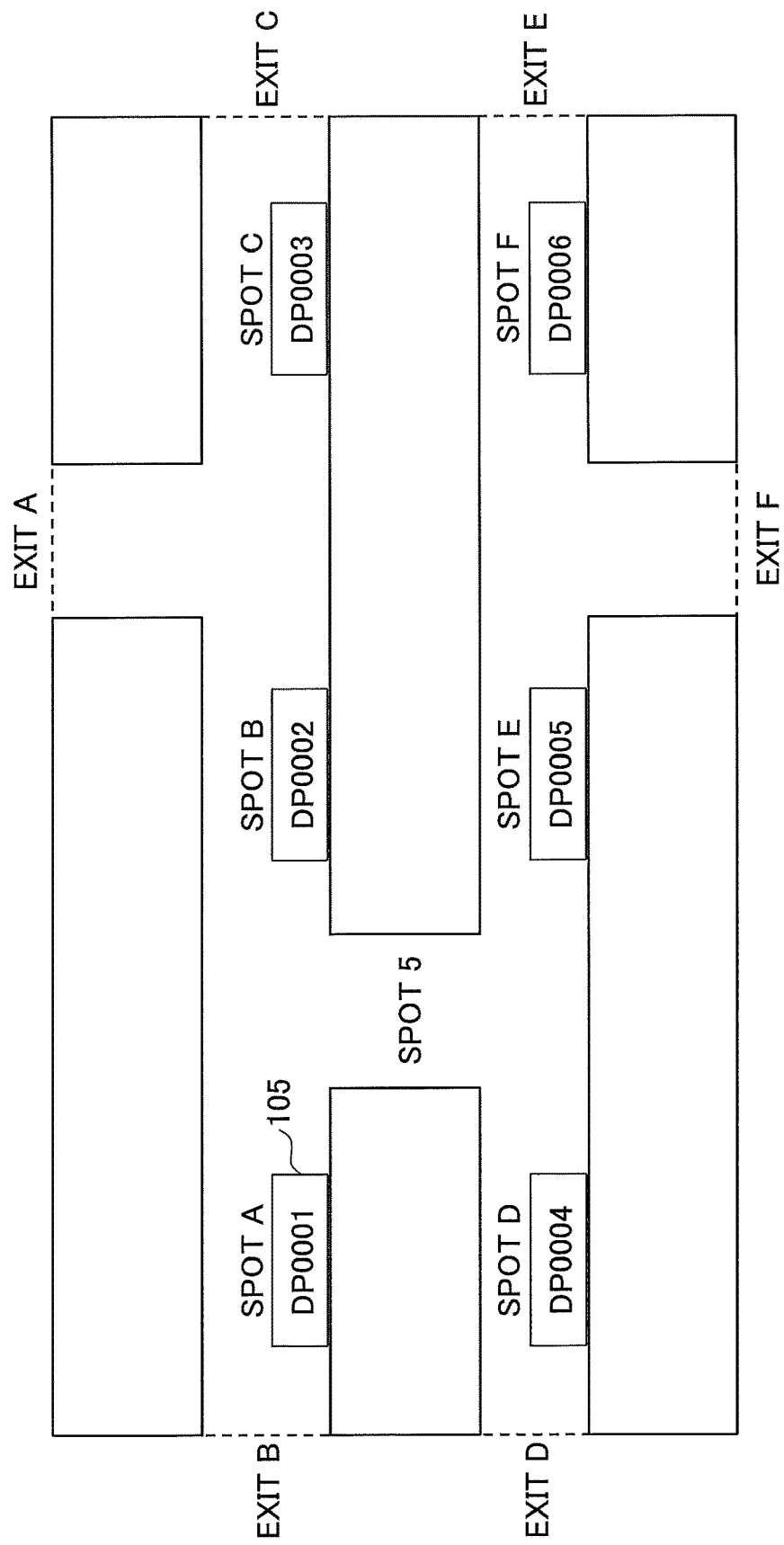

FIGS. 22A and 22B are diagrams illustrating examples of information managed by the position information managing unit 702 according to the fourth embodiment of the present disclosure.

FIG. 22A is a diagram illustrating an example of position information of the display devices stored by the position information managing unit 702 according to the fourth embodiment of the present disclosure. In the example of FIG. 22A, the position information of the display device includes information of "display device ID", "IP address", and "position".

The "display device ID" is an example of identification information for identifying the display device 105. The "IP address" is an example of address information indicating the address of the display device 105. The "position" is an example of information indicating the position where the display device 105 is installed. Note that, for example, when the display device 105 is a movable display device, etc., the position information of the display device does not have to include the information of "position".

Preferably, the position information managing unit 702 stores arrangement information as illustrated in FIG. 22B. In the example of the FIG. 22B, the arrangement information includes the floor layout of the building 107, etc., the positions where the display devices 105 are arranged (spot 1, spot 2, and so on), and display device IDs, etc. Note that, for example, when the display device 105 is a movable display device, etc., the position information managing unit 702 does not have to include the arrangement information.

<Process Flow>

FIG. 23 is a sequence diagram of an example of a process performed by the information providing system 100 according to the fourth embodiment of the present disclosure. Note that the basic process flow is the same as the process flow according to the first embodiment illustrated in FIG. 12, and therefore the processes that are different from the processes of the first embodiment are mainly described. Furthermore, the following description is given assuming that in the system configuration of FIG. 20, the user 106 and the information terminal 104 of the user are in the area B.

In step S2301, the display device 105b (or the output device 2001b included in the display device 105b) outputs acoustic waves including the display device ID "DP0002" of the display device 105b. Note that the display device 105b (or the output device 2001b) is assumed to be continuously outputting acoustic waves including the display device ID of the display device 105b.

In step S2302, the information extracting unit 733 of the information terminal 104 extracts the display device ID of the display device 105b included in the acoustic waves acquired by the signal acquiring unit 732.

In step S2303, the identification information sending unit 734 of the information terminal 104 sends information of the transmission source including the display device ID of the display device 105b extracted by the information extracting unit 733 and the application ID stored in the identification information storage unit 735, to the management server 101. Note that the display device ID of the display device 105b is an example of information of the output device 2001b acquired by the transmission source. Furthermore, the application ID stored in the identification information storage unit 735 is an example of information of the transmission source.

In step S1204, the position information managing unit 702 of the management server 101 receives information sent from the information terminal 104, and the position information identifying unit 705 identifies the position of the transmission source based on the information received from the transmission source and the position information of the display device indicated in FIG. 22A.

In steps S1205 through S1207, the management server 101 acquires the display information corresponding to the transmission source from the content server 750, similar to the first embodiment.

In step S2305, the display control unit 706 of the management server 101 sends a display request requesting to display the display information acquired by the display information acquiring unit 707, to the display device 105b corresponding to the position of the transmission source identified in step S2304. The display request includes, for example, the address information (IP address, etc.) of the display device 105b and the display information, etc.

In step S2306, the display control unit 742 of the display device 105b causes the display unit 606, etc., to display the display information included in the display request, which is received from the management server 101 via the communicating unit 741.

By the above process, when the user 106 holding the information terminal 104 enters the area B in FIG. 20, the display information (content) corresponding to the user 106 is displayed on the display device 105b. Similarly, when the user 106 holding the information terminal 104 enters the area C in FIG. 20, the display information corresponding to the user 106 is displayed on the display device 105c.

Note that in FIG. 20, the display devices 105 are laterally arranged along a single wall; however, the arrangement method is merely one example.

Figure 24:
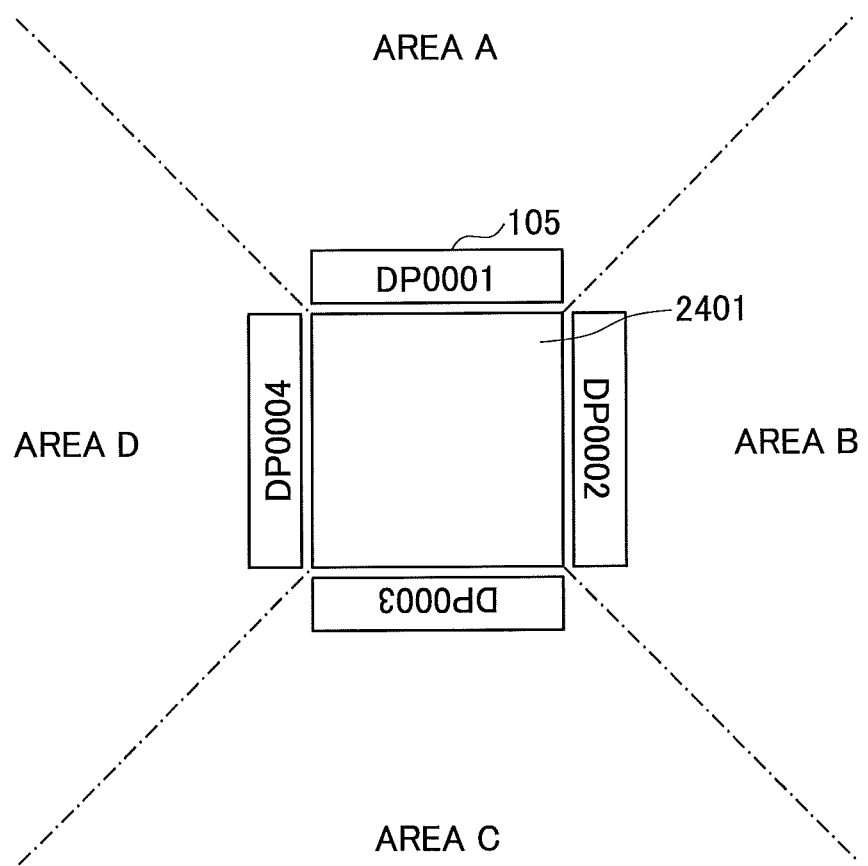
FIG. 24 is a diagram illustrating another example of arrangements of display devices according to the fourth embodiment of the present disclosure.

FIG. 24 is a diagram illustrating another example of arrangements of display devices according to the fourth embodiment of the present disclosure. FIG. 24 is a top view of display devices 105 arranged on four surfaces of a pillar 2401, etc. In the example of FIG. 24, it is assumed that the display device 105 (or the output device 2001 included in the display device 105) having a display device ID "DP0001" is outputting acoustic waves including the display device ID "DP0001" toward an area A. Similarly, the display devices 105 having the display device IDs "DP0002", "DP0003", and "DP0004" are respectively outputting acoustic waves including corresponding device IDs of the own devices, toward areas B, C, and D.

By the above arrangement, for example, when a transmission source moves around the pillar 2401, display information corresponding to the transmission source is sequentially displayed on the respective surfaces in line with the movement of the transmission source. Note that in the arrangement example of FIG. 24, similar to the first embodiment, the output devices 102 may be installed on the ceiling, etc., in the areas A through D.

According to the information providing system 100 according to the present embodiment, for example, the equipment such as the plurality of output devices 102 and the gateway 103, etc., of FIG. 1 can be eliminated. Furthermore, according to the information providing system 100 according to the present embodiment, by using a portable display device 105, display information according to the respective users around the display device 105 can be easily provided.

Fifth Embodiment

In a fifth embodiment, a description is given of an example of a case where the information providing system 100 provides display information to the transmission source based on information of the surroundings of the output device 102 acquired by the output device 102.

<Functional Configuration>

Figure 25:
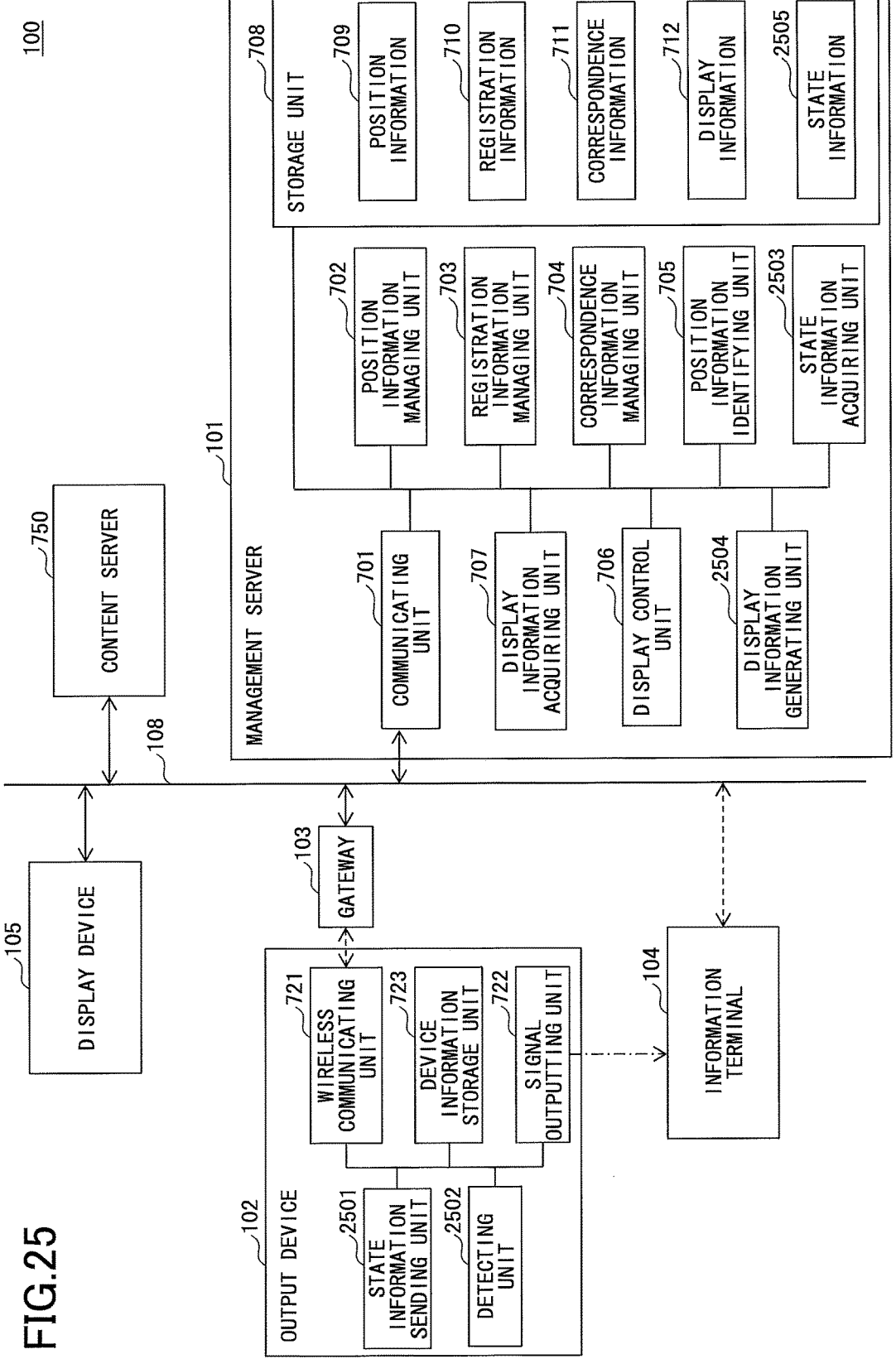
FIG. 25 is a block diagram of a functional configuration of the information providing system according to a fifth embodiment of the present disclosure.

FIG. 25 is a block diagram of a functional configuration of the information providing system 100 according to the fifth embodiment of the present disclosure. Similar to the first embodiment, the information providing system 100 according to the present embodiment includes the management server 101, the output device 102, the gateway 103, the information terminal 104, and the display device 105, etc.

Note that it is assumed that in FIG. 25, the configurations of the gateway 103, the information terminal 104, the display device 105, and the content server 750, etc., are the same as the functional configurations of FIG. 7.

(Functional Configuration of Output Device)

The output device 102 according to the present embodiment includes a state information sending unit 2501 and a detecting unit 2502, in addition to the configuration of the output device 102 according to the embodiment illustrated in FIG. 7.

The state information sending unit 2501 reports state information including information of the surroundings of the output device 102 detected by the detecting unit 2502, to the management server 101 via the wireless communicating unit 721 and the gateway 103. The state information sending unit 2501 is realized by, for example, programs, etc., operating in the CPU 301 of FIG. 3.

The detecting unit 2502 is a unit for acquiring information (for example, the temperature, the humidity, the brightness, whether there is a moving body, and the number of moving bodies, etc.) of the surroundings of the output device 102. The detecting unit 2502 is realized by, for example, the sensor unit 307 of FIG. 3 and programs, etc., operating in the CPU 301 of FIG. 3.

(Functional Configuration of Management Server)

The management server 101 according to the present embodiment includes a state information acquiring unit 2503 and a display information generating unit 2504, etc., in addition to the configuration of the management server 101 according to the embodiment illustrated in FIG. 7.

The state information acquiring unit 2503 acquires state information from the output device 102, and stores the acquired information as state information 2505 in the storage unit 708, etc.

The display information generating unit 2504 generates display information based on the information (for example, the temperature, the brightness, and the number of people, etc.) of the surroundings of the output device 102 included in the state information 2505 stored in the storage unit 708, etc.

(Examples of State Information and Correspondence Information)

FIGS. 26A through 26C are diagrams illustrating examples of state information and correspondence information according to the fifth embodiment of the present disclosure.

FIG. 26A illustrates an example of the state information 2505 that is stored in the storage unit 708, etc., by the state information acquiring unit 2503. In the example of FIG. 26A, the state information includes information such as "output device ID", "position", "temperature", "brightness level", and "crowd level", etc.

The "output device ID" is the output device ID of the output device 102 that has acquired the state information. The "position" is information indicating the position where the output device 102, which has acquired the state information, is installed.

The "temperature", "brightness level", and "crowd level" are examples of information of the surroundings of the output device 102 that is detected by the detecting unit 2502 of the output device 102.

The "temperature" is information indicating the temperature of the surroundings of the output device 102. The "brightness level" is information indicating the brightness of the surroundings of the output device 102. For example, the "brightness level" indicates the brightness of the surroundings in a stepwise manner, and as the brightness increases, the value of the "brightness level" increases. The "crowd level" is information indicating the crowd level (the number of moving bodies, etc.) of the area corresponding to the output device 102. For example, the "crowd level" indicates the crowd level of the area corresponding to the output device 102 in a stepwise manner, and as the crowd level increases, the value of the "crowd level" increases.

FIG. 26B is a diagram illustrating an example of the correspondence information 711 stored by the correspondence information managing unit 704 of the management server 101. In the example of FIG. 26B, the correspondence information according to the present disclosure includes an item of "temperature" instead of "time" in the correspondence information according to the first embodiment in FIG. 11B.

In the information providing system 100 according to the first embodiment, for example, with respect to a transmission source executing an application of an application type "map" at the position "spot 2", different display information items (contents) are provided according to the "time".

On the other hand, in the information providing system 100 according to the present embodiment, for example, with respect to a transmission source executing an application of an application type "map" at the position "spot 2", different display information items are provided according to information (for example, the temperature) of the surroundings of the output device 102. In the example of FIG. 26B, when the temperature is "less than 10 degrees", for example, the information providing system 100 provides display information giving a warm feeling, such as "fireplace and wine" of the content ID "TID001". On the other hand, when the temperature is "higher than 25 degrees", for example, the information providing system 100 provides display information giving a cool feeling, such as "seaside and beer" of the content ID "TID003".

Furthermore, as another example, the information providing system 100 may provide the same display information by changing the color according to the "temperature", such as a color giving a warm feeling or a color giving a cool feeling.

FIG. 26C is a diagram illustrating another example of the correspondence information 711 stored by the correspondence information managing unit 704 of the management server 101. In the example of FIG. 26C, the correspondence information according to the present disclosure includes the same items as the items of the correspondence information according to the first embodiment in FIG. 11B; however, the "acquisition destination" is display information (display information 1 and 2, etc.), instead of a URL. In the example of FIG. 26C, the display information of "temperature of spot 2" of content ID "JID0002" is generated by the display information generating unit 2504 the management server 101, and is stored as "display information 2" in the display information 712. Accordingly, the information providing system 100 according to the present embodiment is able to display the display information including information of the surroundings of the output device 102 detected by the output device 102, on the display device 105 corresponding to the transmission source.

<Process Flow>

FIG. 27 is a sequence diagram of an example of a process performed by the information providing system 100 according to the fifth embodiment of the present disclosure. Note that the basic processes are the same as the processes according to the first embodiment illustrated in FIG. 12, and therefore the processes that are different from the processes of the first embodiment are mainly described.

In step S2701 and step S2702, the state information acquiring unit 2503 of the management server 101 sends a request to acquire state information to a plurality of output devices 102. The request to acquire state information includes, for example, the output device IDs of the respective output devices 102.

In step S2703 and step S2704, the respective output devices 102, which have received the request to acquire state information, send the state information including information of the surroundings of the own device detected by the detecting unit 2502, to the management server 101. The state information includes, for example, the output device ID of each output device and the state information detected by the detecting unit 2502, etc.

As described above, it is assumed that the state information acquiring unit 2503 acquires the state information from a plurality of output devices 102 included in the information providing system 100, for example, at predetermined time intervals (for example, every five minutes, etc.)

In step S2705, the state information acquiring unit 2503 of the management server 101 stores the state information acquired from a plurality of output devices 102, in the storage unit 708.

In step S2706, the display information generating unit 2504 of the management server 101 generates the display information by using, for example, the state information stored in the storage unit 708.

In step S2707, the signal outputting unit 722 of the output device 102a outputs acoustic waves including an output device ID.

In step S2708, the information extracting unit 733 of the information terminal 104 extracts the output device ID included in the acoustic waves acquired from the output device 102a by the signal acquiring unit 732.

In step S2709, the identification information sending unit 734 of the information terminal 104 sends information of the transmission source including, for example, an application ID and the extracted output device ID, to the management server 101.

In step S2710, the communicating unit 701 of the management server 101 receives the information of the transmission source sent from the information terminal 104. Furthermore, the position information identifying unit 705 identifies the position of the transmission source, based on the received information and the position information 709 stored by the position information managing unit 702.

In step S2711, the display information acquiring unit 707 selects the display information corresponding to the information of the transmission source.

In step S2712, the display information acquiring unit 707 acquires the display information corresponding to the information of the transmission source. For example, the display information acquiring unit 707 acquires the display information from the content server 750, based on the correspondence information illustrated in FIG. 26B. Alternatively, the display information acquiring unit 707 acquires the display information from the display information 712 in the storage unit 708, based on the correspondence information illustrated in FIG. 26C.

In step S2713, the display control unit 706 of the management server 101 sends a display request including the display information acquired by the display information acquiring unit 707, to the display device 105a corresponding to the output device 102a.

In step S2714, the display device 105a that has received the display request from the management server 101 causes, for example, the display unit 606, etc., to display the display information included in the display request.

As described above, according to the information providing system 100 according to the present embodiment, the display information according to the information of the surroundings of the output device 102 can be displayed on the display device corresponding to the transmission source.

Other Embodiment

The system configurations according to the above embodiments are examples; the information providing system 100 may have various system configurations. For example, in the example of the system configuration of the information providing system 100 illustrated in FIG. 1, there is a single gateway 103; however, the information providing system 100 may include two or more gateways 103. Alternatively, the information providing system 100 may be able to enlarge the wireless area for communication between the plurality of output devise 102, by adopting multihop communication such as Zigbee, etc.

Furthermore, at least a part of the information such as the position information 709, the registration information 710, and the correspondence information 711, etc., stored in the storage unit 708 of the management server 101 illustrated in FIG. 7 may be stored in an external server, etc.

<Overview>

As described above, an information processing apparatus (101) according to the present embodiment uses a display device (105) to provide display information. The information processing apparatus (101) includes a manager (702) configured to store information relating to a position of an output device (102) that outputs information relating to the output device, and information relating to the display device (105) corresponding to the position; a receiver (701) configured to receive information of a transmission source (104) and the information of the output device (102) acquired by the transmission source (104), from the transmission source (104) capable of communicating with the information processing apparatus (101); an identifier (705) configured to identify a position of the transmission source (104) based on the received information; and a display controller (706) configured to control the display device (105) corresponding to the position of the transmission source (104) to display the display information according to the information of the transmission source (104).

By the above configuration, it is possible to provide an information providing system (100) that uses a display device (105) to provide display information to a plurality of users, and that facilitates the operation of providing the display information according to the respective users.

The above reference numerals in parenthesis are given as examples for facilitating the understanding; however, the scope of the present disclosure is not so limited.

The information processing apparatus, the information providing method, and the information providing system are not limited to the specific embodiments described herein, and variations and modifications may be made without departing from the spirit and scope of the present disclosure.

What is claimed is:

1. A display device communicating with an information terminal and with a server apparatus, the display device comprising:
   an output device which outputs identification information of the output device on an acoustic wave; and
   processing circuitry which controls the display device and performs steps of:

controlling the output device to output the identification information of the output device on the acoustic wave toward an area corresponding to the output device;

receiving, from the server apparatus, a display request including at least content data, which corresponds to the information terminal and which is to be displayed on the display device; and displaying the content data based on the display request, wherein the identification information of the output device is received by the information terminal in the area, the identification information is sent from the information terminal to the server apparatus together with application identification information of an application that is installed in the information terminal, the identification information is used together with the application identification information, by the server apparatus, to identify a position of the information terminal, and the identification information is used, by the server apparatus, to identify the display device which provides information relating to the application in the information terminal whose position is identified.

2. The display device according to claim 1, wherein the content data included in the display request corresponds to the position of the information terminal.

3. The display device according to claim 1, wherein the content data included in the display request corresponds to a type of application software of the application installed in the information terminal.

4. The display device according to claim 1, wherein the content data included in the display request changes with time.

5. The display device according to claim 1, wherein the content data included in the display request corresponds to a type of application software of the application installed in each of the information terminals.

6. A non-transitory computer-readable recording medium storing a program that causes a computer to execute a process performed in a display device communicating with an information terminal and with a server apparatus, the process comprising:

outputting, by an output device included in the display device, identification information of the output device on an acoustic wave;

controlling the output device to output the identification information of the output device on the acoustic wave toward an area corresponding to the output device;

receiving, from the server apparatus, a display request including at least content data, which corresponds to the information terminal and which is to be displayed on the display device; and displaying the content data based on the display request, wherein the identification information of the output device is received by the information terminal in the area, the identification information is sent from the information terminal to the server apparatus together with application identification information of an application that is installed in the information terminal, the identification information is used together with the application identification information, by the server apparatus, to identify a position of the information terminal, and the identification information is used, by the server apparatus, to identify the display device which provides information relating to the application in the information terminal whose position is identified.

7. A display method executed by a computer performed in a display device communicating with an information terminal and with a server apparatus, the display method comprising:

outputting, by an output device included in the display device, identification information of the output device on an acoustic wave;

controlling the output device to output the identification information of the output device on the acoustic wave toward an area corresponding to the output device;

receiving, from the server apparatus, a display request including at least content data, which corresponds to the information terminal and which is to be displayed on the display device; and displaying the content data based on the display request, wherein the identification information of the output device is received by the information terminal in the area, the identification information is sent from the information terminal to the server apparatus together with application identification information of an application that is installed in the information terminal, the identification information is used together with the application identification information, by the server apparatus, to identify a position of the information terminal, and the identification information is used, by the server apparatus, to identify the display device which provides information relating to the application in the information terminal whose position is identified.

* * * * *